United States Patent
Ruback et al.

(10) Patent No.: US 9,973,585 B2
(45) Date of Patent: May 15, 2018

(54) METHODS, APPARATUS AND SYSTEMS FOR PROVIDING NOTICE OF DIGITAL TRACKING TECHNOLOGIES IN MOBILE APPS ON MOBILE DEVICES, AND FOR RECORDING USER CONSENT IN CONNECTION WITH SAME

(71) Applicant: Evidon, Inc., New York, NY (US)

(72) Inventors: Todd B. Ruback, New York, NY (US); Jon Sheppard, South Jordan, UT (US)

(73) Assignee: Evidon, Inc., New York, NY (US)

( * ) Notice: Subject to any disclaimer, the term of this patent is extended or adjusted under 35 U.S.C. 154(b) by 158 days.

(21) Appl. No.: 15/096,220

(22) Filed: Apr. 11, 2016

(65) Prior Publication Data
US 2016/0301764 A1  Oct. 13, 2016

Related U.S. Application Data

(60) Provisional application No. 62/146,294, filed on Apr. 11, 2015, provisional application No. 62/147,578, filed on Apr. 14, 2015.

(51) Int. Cl.
*H04L 29/08* (2006.01)
*G06F 3/0482* (2013.01)
(Continued)

(52) U.S. Cl.
CPC .......... *H04L 67/22* (2013.01); *G06F 3/0482* (2013.01); *G06F 3/04842* (2013.01);
(Continued)

(58) Field of Classification Search
CPC ...... H04L 67/22; H04W 12/02; H04W 4/028; H04W 4/206; H04W 4/043;
(Continued)

(56) References Cited

U.S. PATENT DOCUMENTS 5,870,559 A   2/1999  Leshem
6,144,962 A   11/2000  Weinberg et al.
(Continued)

FOREIGN PATENT DOCUMENTS

EP   2659367 B1   2/2017
WO   WO-2006033108 A2   3/2006
(Continued)

OTHER PUBLICATIONS

U.S. Appl. No. 15/059,296, filed Mar. 2, 2016, Nielsen et al.
(Continued)

*Primary Examiner* — Harunur Rashid
*Assistant Examiner* — Cheng-Feng Huang
(74) *Attorney, Agent, or Firm* — Cooley LLP

(57) ABSTRACT

Notice and consent features are provided, to a user of a mobile device who opens a mobile app, relating to tracking technologies ("trackers") present within the mobile app. The user may be provided with a list of one or more trackers present within the mobile app and, if a tracker is not essential to the functioning of the app, the user may disable the tracker. User selections relating to notice of the presence of trackers in a mobile app, and disabling trackers, are transmitted from the mobile device to a third-party server to provide a record of the user's consent regarding the presence of the tracker(s) in the mobile app. The types of notice and consent options provided to the user in connection with the presence of trackers in the mobile app may vary from jurisdiction to jurisdiction depending on the location of the mobile device when the user initiates the mobile app.

41 Claims, 16 Drawing Sheets

(51) Int. Cl.
  *G06F 3/0484* (2013.01)
  *G06F 21/60* (2013.01)
  *G06F 21/62* (2013.01)
  *H04W 4/20* (2018.01)
  *G06F 9/44* (2018.01)
  *H04W 4/02* (2018.01)
  *H04W 12/02* (2009.01)
  *H04W 4/04* (2009.01)

(52) U.S. Cl.
  CPC ........ *G06F 3/04847* (2013.01); *G06F 9/4443* (2013.01); *G06F 21/604* (2013.01); *G06F 21/6245* (2013.01); *H04W 4/028* (2013.01); *H04W 4/206* (2013.01); *H04W 12/02* (2013.01); *G06F 2221/2115* (2013.01); *H04W 4/043* (2013.01)

(58) Field of Classification Search
  CPC .. G06F 3/04847; G06F 9/4443; G06F 3/0482; G06F 21/6245; G06F 21/604; G06F 3/04842; G06F 2221/2115
  See application file for complete search history.

(56) References Cited

U.S. PATENT DOCUMENTS

| | | |
|---|---|---|
| 6,993,586 B2 | 1/2006 | Chen et al. |
| 7,756,744 B2 | 7/2010 | Schiff et al. |
| 7,895,078 B2 | 2/2011 | Schiff et al. |
| 8,132,095 B2 | 3/2012 | Seolas et al. |
| 8,261,362 B2 | 9/2012 | Goodwin et al. |
| 8,365,062 B2 | 1/2013 | Seolas et al. |
| 8,448,241 B1 | 5/2013 | Kadakia |
| 8,516,590 B1 | 8/2013 | Ranadive et al. |
| 8,516,601 B2 | 8/2013 | Goodwin et al. |
| 8,578,019 B2 | 11/2013 | Seolas et al. |
| 8,589,790 B2 | 11/2013 | Seolas et al. |
| 8,640,037 B2 | 1/2014 | Goodwin et al. |
| 8,805,946 B1 | 8/2014 | Glommen |
| 8,843,827 B2 | 9/2014 | Koo et al. |
| 8,898,808 B1 | 11/2014 | Kittrell et al. |
| 8,904,278 B1 | 12/2014 | Anderson et al. |
| 8,990,298 B1 | 3/2015 | Anderson |
| 8,996,986 B2 | 3/2015 | Manion et al. |
| 8,997,081 B1 | 3/2015 | Manion et al. |
| 9,003,552 B2 | 4/2015 | Goodwin et al. |
| 9,081,789 B2 | 7/2015 | Anderson |
| 9,116,608 B2 | 8/2015 | Koo et al. |
| 9,203,720 B2 | 12/2015 | Seolas et al. |
| 9,219,787 B1 | 12/2015 | Manion et al. |
| 9,268,547 B2 | 2/2016 | Manion et al. |
| 9,288,256 B2 | 3/2016 | Goodwin |
| 9,313,287 B2 | 4/2016 | Glommen et al. |
| 9,357,023 B2 | 5/2016 | Glommen et al. |
| 9,357,366 B2 | 5/2016 | Seolas et al. |
| 9,361,631 B2 | 6/2016 | Meyer et al. |
| 9,363,311 B1 | 6/2016 | McWilliams et al. |
| 9,412,115 B2 | 8/2016 | Seolas et al. |
| 9,418,170 B2 | 8/2016 | Seolas et al. |
| 9,424,593 B2 | 8/2016 | Schiff et al. |
| 9,436,580 B2 | 9/2016 | Manion et al. |
| 9,479,609 B2 | 10/2016 | Anderson |
| 9,537,964 B2 | 1/2017 | Glommen et al. |
| 9,553,918 B1 | 1/2017 | Manion et al. |
| 2004/0176104 A1 | 9/2004 | Arcens |
| 2004/0185875 A1 | 9/2004 | Diacakis et al. |
| 2005/0262104 A1 | 11/2005 | Robertson et al. |
| 2006/0101155 A1 | 5/2006 | Damour et al. |
| 2006/0223518 A1 | 10/2006 | Haney |
| 2007/0178908 A1 | 8/2007 | Doyle |
| 2007/0217557 A1 | 9/2007 | Schiff et al. |
| 2008/0172274 A1 | 7/2008 | Hurowitz et al. |
| 2009/0287713 A1 | 11/2009 | Anderson et al. |
| 2010/0030792 A1 | 2/2010 | Swinton et al. |
| 2010/0161411 A1 | 6/2010 | Wu et al. |
| 2010/0299205 A1 | 11/2010 | Erdmann et al. |
| 2010/0312647 A1 | 12/2010 | Schiff et al. |
| 2011/0196743 A1 | 8/2011 | Schiff et al. |
| 2012/0030559 A1 | 2/2012 | Manion et al. |
| 2012/0072488 A1 | 3/2012 | Manion et al. |
| 2012/0144282 A1 | 6/2012 | Loeb et al. |
| 2012/0158792 A1* | 6/2012 | MacLaurin ....... G06F 17/30702 707/802 |
| 2012/0174236 A1 | 7/2012 | Goodwin et al. |
| 2012/0209987 A1* | 8/2012 | Rhinelander ......... G06Q 30/02 709/224 |
| 2012/0210377 A1 | 8/2012 | Wong et al. |
| 2012/0246310 A1 | 9/2012 | Broda et al. |
| 2012/0284801 A1 | 11/2012 | Goodwin et al. |
| 2013/0311496 A1 | 12/2012 | Cao et al. |
| 2013/0160120 A1 | 6/2013 | Malaviya et al. |
| 2013/0191647 A1 | 7/2013 | Ferrara et al. |
| 2013/0212638 A1 | 8/2013 | Wilson |
| 2013/0227078 A1 | 8/2013 | Wei et al. |
| 2013/0263023 A1 | 10/2013 | Goodwin et al. |
| 2013/0276136 A1 | 10/2013 | Goodwin et al. |
| 2013/0290480 A1 | 10/2013 | Manion et al. |
| 2013/0326476 A1 | 12/2013 | Wyatt et al. |
| 2013/0331067 A1 | 12/2013 | Coussemaeker et al. |
| 2014/0041048 A1 | 2/2014 | Goodwin et al. |
| 2014/0052851 A1 | 2/2014 | Nielsen |
| 2014/0082482 A1 | 3/2014 | Seolas et al. |
| 2014/0137006 A1 | 5/2014 | Goodwin et al. |
| 2014/0208216 A1 | 7/2014 | Koo et al. |
| 2015/0058121 A1 | 2/2015 | Navin |
| 2015/0066587 A1 | 3/2015 | Glommen et al. |
| 2015/0120858 A1 | 4/2015 | Anderson |
| 2015/0127720 A1 | 5/2015 | Glommen et al. |
| 2015/0143244 A1 | 5/2015 | Koo et al. |
| 2015/0154637 A1 | 6/2015 | Schiff et al. |
| 2015/0169784 A1 | 6/2015 | Anderson |
| 2015/0207869 A1 | 7/2015 | Manion et al. |
| 2015/0212992 A1 | 7/2015 | Anderson et al. |
| 2015/0213282 A1 | 7/2015 | Goodwin et al. |
| 2015/0295988 A1 | 10/2015 | Goodwin |
| 2015/0363244 A1* | 12/2015 | Bott ..................... G06F 9/541 719/328 |
| 2016/0044128 A1 | 2/2016 | Anderson |
| 2016/0072905 A1 | 3/2016 | Glommen et al. |
| 2016/0078078 A1 | 3/2016 | Seolas et al. |
| 2016/0085658 A1 | 3/2016 | Manion et al. |
| 2016/0164954 A1 | 6/2016 | McWilliams et al. |
| 2016/0173651 A1 | 6/2016 | Manion et al. |
| 2016/0180375 A1 | 6/2016 | Rose et al. |
| 2016/0198015 A1 | 7/2016 | Goodwin |
| 2016/0269497 A1 | 9/2016 | Glommen et al. |
| 2016/0314502 A1 | 10/2016 | Lindsay et al. |
| 2016/0314503 A1 | 10/2016 | Lindsay et al. |
| 2016/0337367 A1 | 11/2016 | Goodwin et al. |
| 2016/0344684 A1 | 11/2016 | Strycker et al. |
| 2016/0381122 A1 | 12/2016 | Glommen et al. |
| 2017/0006086 A1 | 1/2017 | McWilliams et al. |
| 2017/0041426 A1 | 2/2017 | Anderson |

FOREIGN PATENT DOCUMENTS

| | | |
|---|---|---|
| WO | WO-2006033108 A3 | 12/2006 |
| WO | WO-2011084843 A1 | 7/2011 |
| WO | WO-2012092487 A1 | 7/2012 |
| WO | WO-2013126084 A2 | 8/2013 |
| WO | WO-2013126084 A3 | 8/2013 |
| WO | WO-2014116542 A1 | 7/2014 |
| WO | WO-2014144498 A2 | 9/2014 |
| WO | WO-2014144498 A3 | 9/2014 |
| WO | WO-2014151539 A1 | 9/2014 |
| WO | WO-2015031400 A1 | 3/2015 |
| WO | WO-2015031402 A1 | 3/2015 |
| WO | WO-2015069659 A1 | 5/2015 |
| WO | WO-2015157646 A1 | 10/2015 |
| WO | WO 2016/028771 | 2/2016 |

(56) References Cited

FOREIGN PATENT DOCUMENTS

WO    WO-2016044534 A1    3/2016
WO    WO-2016064431 A1    4/2016

OTHER PUBLICATIONS

U.S. Appl. No. 15/166,678, filed May 27, 2016, Meyer et al.
Office Action dated Oct. 8, 2015 from U.S. Appl. No. 13/968,098.
Notice of Allowance dated Apr. 25, 2016 from U.S. Appl. No. 12/971,577.
Notice of Allowance dated Sep. 10, 2014 from U.S. Appl. No. 14/152,480.
Office Action dated Mar. 26, 2014 from U.S. Appl. No. 14/152,480.
International Search Report and Written Opinion dated Apr. 14, 2015 from Application No. PCT/US2014/052117.
Office Action dated May 15, 2015 from U.S. Appl. No. 12/971,588.
Office Action dated May 29, 2012 from U.S. Appl. No. 12/971,588.
Office Action dated Oct. 6, 2015 from U.S. Appl. No. 12/971,588.
Office Action dated Dec. 21, 2012 from U.S. Appl. No. 12/971,588.
Nielsen, co-pending U.S. Publication No. 2014-0052851, published Feb. 20, 2014.
Navin, co-pending U.S. Publication No. 2015-0058121, published Feb. 26, 2015.
International Search Report and Written Opinion dated Jul. 7, 2016 from Application No. PCT/US2016/020531.
International Search Report and Written Opinion dated Jul. 6, 2016 from Application No. PCT/US2016/026994.
Office Action dated Jun. 17, 2016 from U.S. Appl. No. 13/968,098.
Extended European Search Report dated Feb. 2, 2017 from European Patent Application No. 14771984.3-1871, 7 pages.
Supplementary European Search Report dated Feb. 22, 2017 from European Patent Application No. 14771984.3-1871, 2 pages.
Office Action dated Feb. 21, 2017 from U.S. Appl. No. 14/465,389.

\* cited by examiner

```
__ev_hover.s({
    enabled: true,
    cookie_on_sub_domain: true,
    hover: false,
    bric: false,
    ric: "Our site uses cookies and other technologies so that we, and
our partners, can remember you and understand how you and other
visitors use our site. To see a complete list of the companies that
use these cookies and technologies and to tell us whether they can be
used on your device or not, access our Cookie Consent Tool available
on every page.",
    ric_mobile: true,
    ric_learn_more: "Learn More",
    ric_font: '8pt Verdana',
    ric_title: "About Cookies on this site:",
    ric_title_font: '12pt Verdana',
    ric_title_color: '#FFFFFF',
    ric_icon: true,
    ric_bg: '#FFA500',
    ric_border: '1px solid #000000',
    ric_color: '#FFFFFF',
    ric_fade: 15,
    ric_max: 4,
    ric_session_max: 1,
    ric_width: 80,
    ric_rounded_corners: true,
    ric_opacity: 100,
    ric_location: 'bottom',
    ric_offset: 0,
    categories: [
        {
            name:"essential",
            3rdParties: [
                {
                    company-name: ███████,
                    company-logo-url: ████████████,
                    company-daa-description: ████████,
                    company-daa-link: ████████,
                }
                {
                    company-name: '█████,
                    company-logo-url: ████████████,
                    company-daa-description: ████████,
                    company-daa-link: ████████,
                }
            }
        }
        {
```

FIG. 4A

```
        name:"advertising",
      3rdParties: [
412 ─┐   {
         company-name: ▇▇▇
         company-logo-url:
▇▇▇▇▇▇▇▇▇▇▇▇▇▇▇▇▇▇▇▇▇▇▇▇▇▇▇▇,
         company-daa-description: ▇▇▇ is the leader in
mobile app and cross-screen retargeting. Created by e-commerce
pioneers, the ▇▇▇ platform combines proprietary retargeting
technology to deliver targeted, relevant creative and offers to
consumers. The ▇▇▇ platform connects the dots between mobile
customer acquisition and retention, giving brands the tools they need
to drive multi-screen revenue."
         company-daa-link:
▇▇▇▇▇▇▇▇▇▇▇▇▇▇▇▇▇▇▇▇▇▇▇▇
      }
      {
         company-name: ▇▇▇,
         company-logo-url:
▇▇▇▇▇▇▇▇▇▇▇▇▇▇▇▇▇▇▇▇▇▇▇▇▇▇▇▇
         company-daa-description: "▇▇▇ is cool",
         company-daa-link:
▇▇▇▇▇▇▇▇▇▇▇▇▇▇▇▇▇▇▇▇▇▇
      }
   ]}
   {
      name:"analytics" ─ 414
      3rdParties: [
      {
         company-name: ▇▇▇▇▇▇▇,
         company-logo-url:
▇▇▇▇▇▇▇▇▇▇▇▇▇▇▇▇▇▇▇▇▇▇▇▇▇▇▇▇
         company-daa-description: ▇▇▇ is the leader in
mobile app and cross-screen retargeting. Created by e-commerce
pioneers, the ▇▇▇ platform combines proprietary retargeting
technology to deliver targeted, relevant creative and offers to
consumers. The ▇▇▇ platform connects the dots between mobile
customer acquisition and retention, giving brands the tools they need
to drive multi-screen revenue."
         company-daa-link:
▇▇▇▇▇▇▇▇▇▇▇▇▇▇▇▇▇▇▇▇▇▇▇▇
      }
      }
   ]
}];
```

FIG. 5F

METHODS, APPARATUS AND SYSTEMS FOR PROVIDING NOTICE OF DIGITAL TRACKING TECHNOLOGIES IN MOBILE APPS ON MOBILE DEVICES, AND FOR RECORDING USER CONSENT IN CONNECTION WITH SAME

CROSS-REFERENCE TO RELATED APPLICATIONS

This application claims a priority benefit of U.S. Provisional Application 62/146,294, filed on Apr. 11, 2015, and entitled "Methods, Apparatus and Systems to Provide User Notice and Consent Regarding Tracking Devices in Mobile Sites and Applications," and U.S. Provisional Application 62/147,578, filed on Apr. 14, 2015, and entitled "Methods, Apparatus and Systems to Provide User Notice and Consent Regarding Tracking Devices in Mobile Sites and Applications," both of which applications are incorporated herein by reference in their entirety.

This application also relates to U.S. patent application Ser. No. 12/791,588, filed on Dec. 17, 2010, and entitled, "Managing and Monitoring Digital Advertising," and U.S. patent application Ser. No. 14/465,389, filed on Aug. 21, 2014, and entitled, "System and Method for Controlling Targeted Advertising," both of which applications are incorporated herein by reference in their entirety.

TECHNICAL FIELD

The present disclosure relates generally to systems, apparatus, and methods for privacy controls relating to mobile devices. More specifically, the present disclosure relates to systems, apparatus, and methods for providing a user with notice and consent options customized to a mobile app, user location, and/or user language preferences.

BACKGROUND

With at least 2.6 billion global smartphone subscriptions today and 6.1 billion global smartphone subscriptions expected by 2020, more people are using and, in some cases, relying on smartphones for access to online services and information. Approximately two-thirds of U.S. adults now own a smartphone, and almost half of U.S. adults own a tablet computer. Computer programs designed to run on a mobile device (mobile apps) provide functions which do not include running the mobile device itself. Mobile apps are designed to run on specific mobile devices, and are written for specific operating systems (e.g., iOS, Windows®, or Android™). The marketplace for mobile apps is booming with thousands of new mobile apps being introduced and millions of mobile apps being downloaded every day from digital distribution platforms called app stores (e.g., Apple® App Store, Google Play™ store, Windows Phone® Store, Amazon® Appstore, and BlackBerry® World® storefront). Mobile apps now provide users with functions including games, multimedia, communication, productivity, information retrieval, and payment services.

SUMMARY

Along with these growing capabilities, mobile apps also create new privacy challenges, including the difficulty of providing consumers with meaningful information about privacy choices on small screens, as well as the many entities that may have access to or be tracking user information or behaviors related to mobile apps and the mobile devices running those apps. In some instances, behavioral tracking has benefits. For example, a user using a mobile device to retrieve information regarding a type of restaurant or cuisine may enjoy receiving a coupon or an advertisement for a restaurant of that type or serving that cuisine. However, a user using a mobile app that collects, for example, personal location information or medical information, would likely prefer to receive notice prior to using the app of what information is being tracked by whom and for what purpose.

Tracking technologies include gathering user data for any purpose (including usage data, personal data, etc.). Some example categories for tracking technologies include, but are not limited to, essential, advertising, and/or analytics. For example, tracking a location of a mobile device is essential to a mobile app for providing realtime directions to a destination, but tracking the location of a mobile device is not essential to a mobile app for shopping at a retail store, even though the location may be relevant for advertising and/or analytics. Tracking technologies are not limited to first party tracking, but also include third party tracking. For example, the mobile app for providing realtime directions to a destination may partner with a retail store to display advertisements for the store when the mobile device is within the vicinity of the store or to collect information about how many people pass within the vicinity of the store during a certain time period.

In many instances, a mobile device user is simply unaware that his or her activities are being tracked. Even if the mobile device user is aware, conventional mobile apps do not provide a mechanism to respectively identify different tracking technologies present in the mobile app, or provide the ability for a user to opt in or opt out of an identified tracking technology (thereby permitting or preventing tracking according to the mobile device user's preferences).

In response, various local, national, and regional governments as well as individual companies, industry associations, and privacy groups have taken steps to address some of the concerns and issues raised by mobile app tracking. For example, in 2003, the European Union implemented Directive 2002/58 on Privacy and Electronic Communications (the "E-Privacy Directive"), since amended by Directives 2006/24/EC and 2009/136/EC, to regulate confidentiality of consumer information by requiring that not only desktop and mobile websites, but also mobile apps, provide sufficient notice ("clear and comprehensive information") and obtain valid consent from their users.

Similarly, in 2009, leading industry associations issued the "Self-Regulatory Program for Online Behavioral Advertising" to apply consumer-friendly standards corresponding to tenets proposed by the U.S. Federal Trade Commission (FTC) in February 2009, and also address public education and industry accountability issues raised by the FTC. The standards address consumer concerns about the use of personal information and interest-based advertising via education, transparency, consent, customizable preferences, appropriate security, limited retention of data, and monitoring.

Until now, however, there has not been a solution for mobile app developers to comply easily and effectively with these principles and regulations like the E-Privacy Direction. The present disclosure relates generally to systems, apparatus, and methods for transparency and privacy controls relating to connected devices that go beyond these principles and regulations. More specifically, the present disclosure relates to systems, apparatus, and methods for providing a user with notice and consent options customized to a mobile app, user location, and/or user language preferences. According to some embodiments, these notice and consent options may be leveraged as a notice and compliance tool for all connected devices (i.e., the "Internet of Things") that have a user interface, such as a mobile app interface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A and 4B are computer program listings illustrating a notice configuration file for a mobile app in accordance with some embodiments.

Figures 5A, 5B:
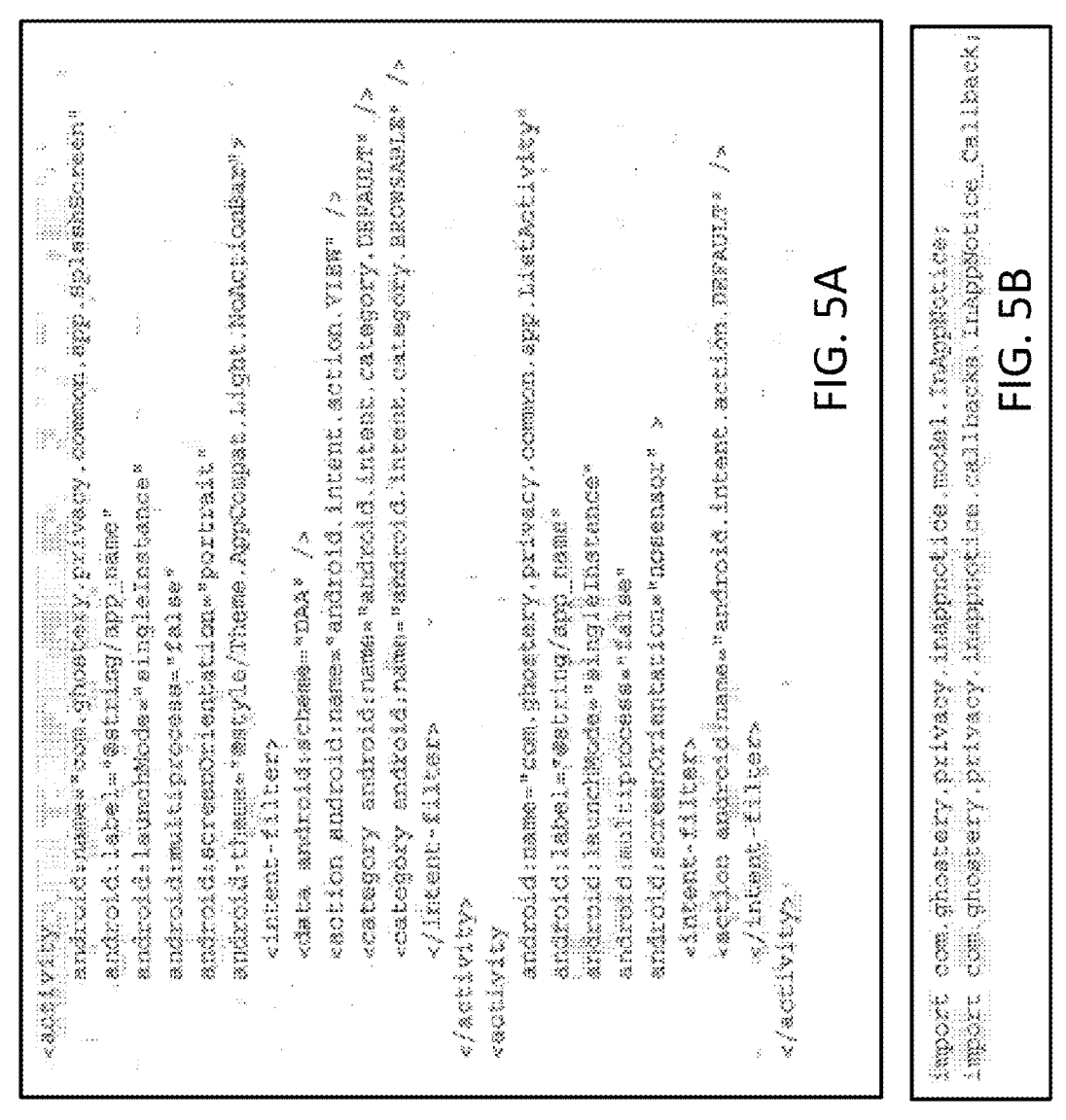
Figures 5C, 5D:
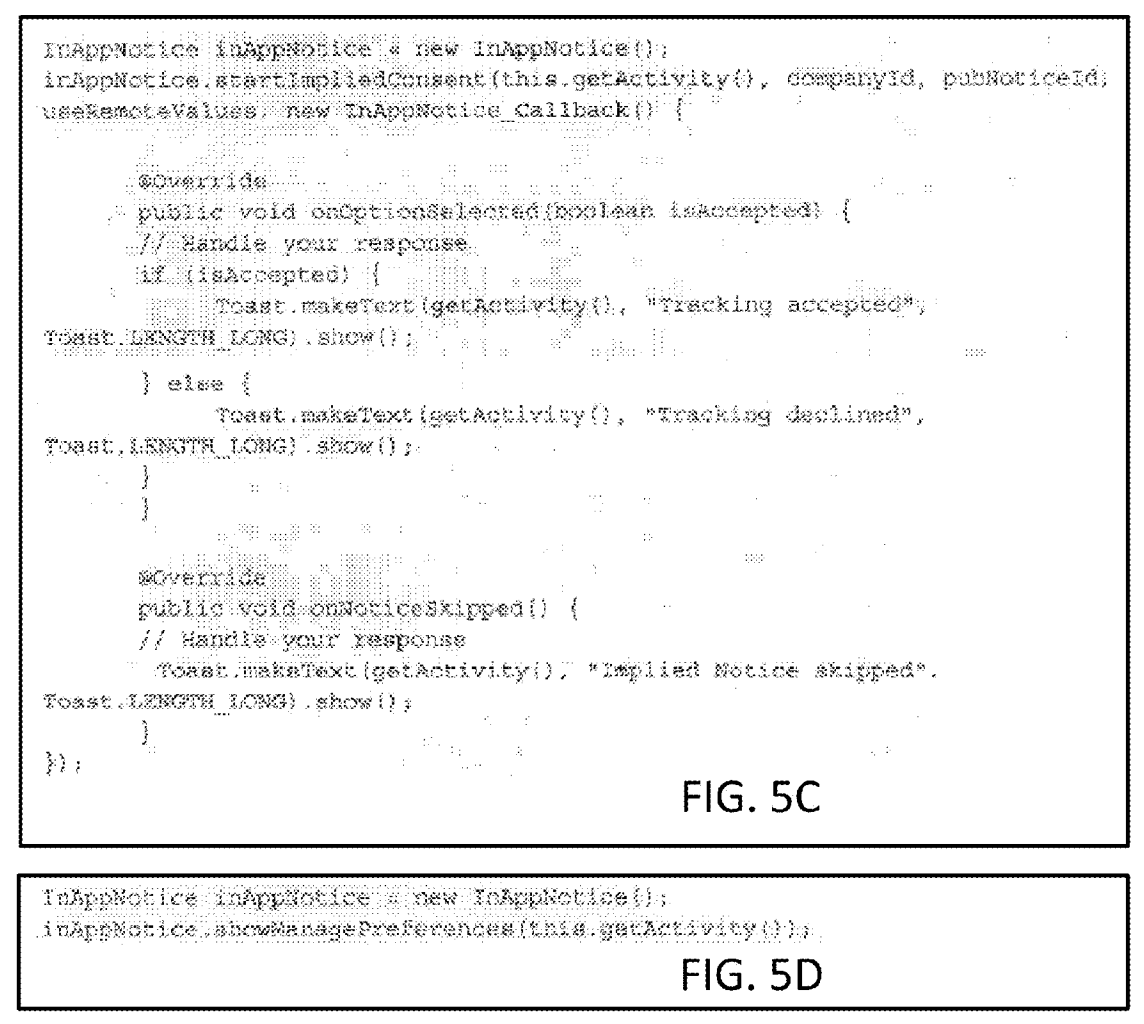
Figures 5E, 5F:
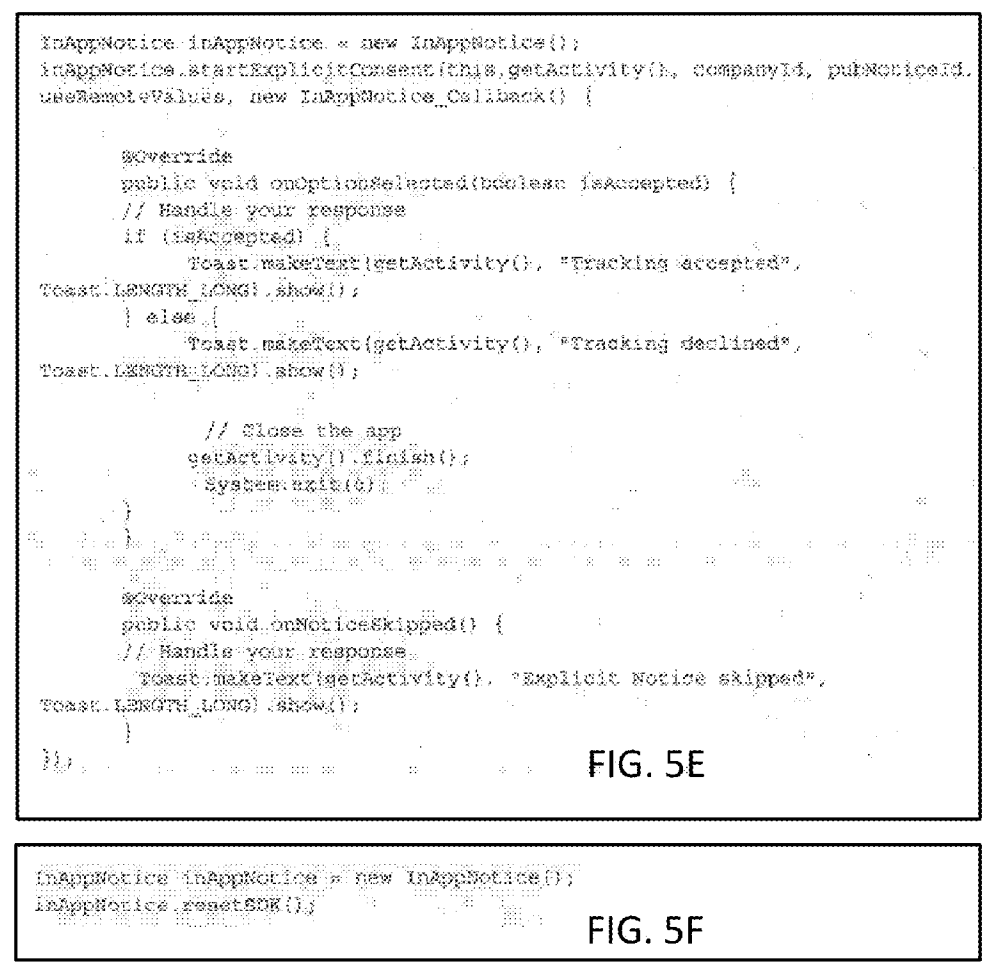

FIGS. 5A-5F are computer program listings illustrating SDK integration in a mobile app in accordance with some embodiments.

DETAILED DESCRIPTION

The present disclosure relates generally to systems, apparatus, and methods for privacy controls relating to mobile devices. More specifically, the present disclosure relates to systems, apparatus, and methods for providing a user with notice and consent options customized to a mobile app, user location, and/or user language preferences.

Figure 1A:
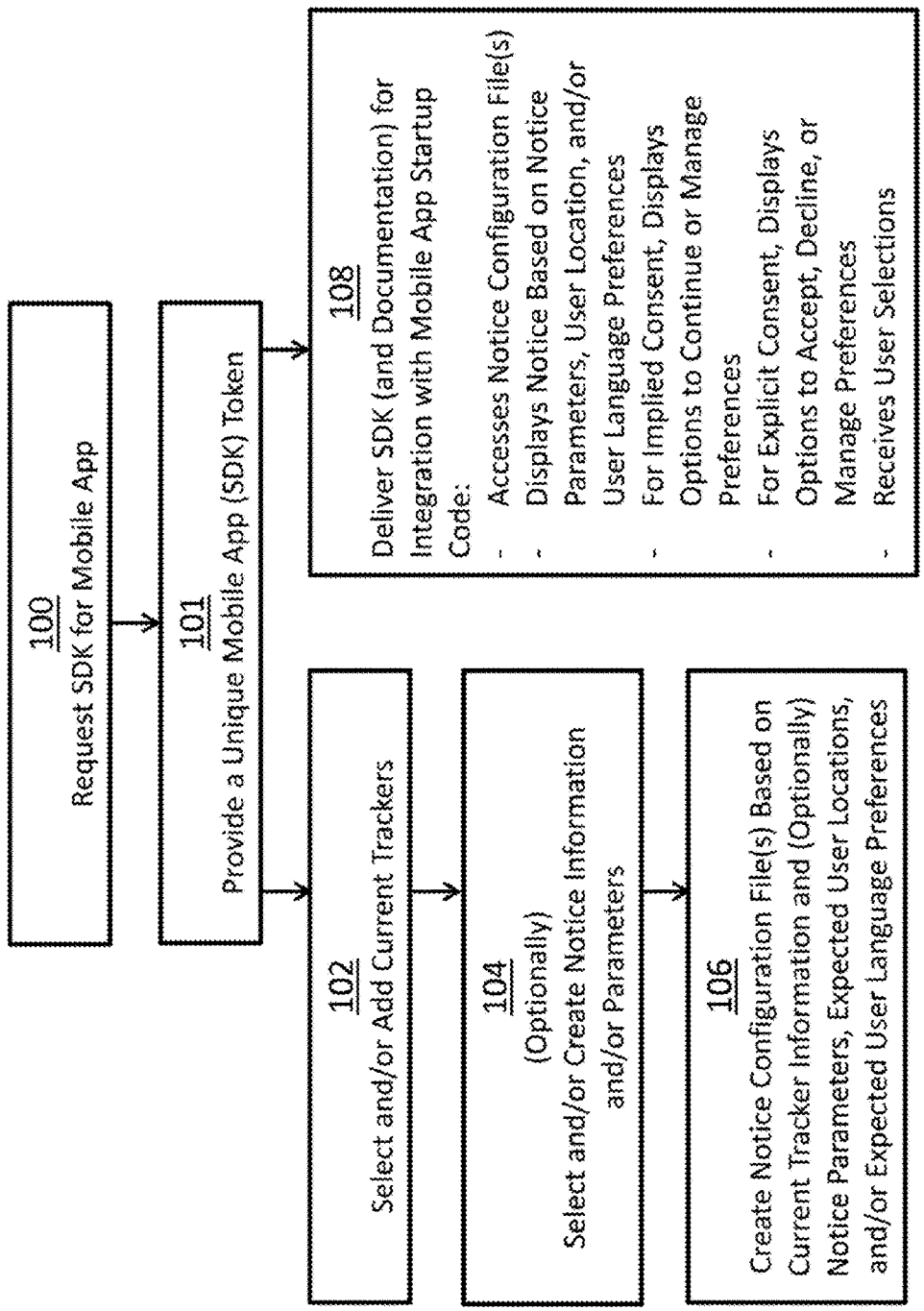
FIG. 1A is a flowchart illustrating a process for configuring tracking notice and consent functionality in a mobile app in accordance with some embodiments.

FIG. 1A is a flowchart illustrating a process for configuring tracking notice and consent functionality in a mobile app in accordance with some embodiments. In step 100, a mobile app developer requests a software development kit (SDK or "devkit"). According to some embodiments, an SDK comprises a compiled library that is intended to be included inside of a third-party mobile app. In step 101, a web service assigns a unique mobile app token (e.g., an SDK or application program interface (API) token) to the mobile app for authentication purposes. The mobile app token may include a customer ID and/or a notice configuration ID.

In step 102, tracking technologies that collect user data for any purpose (including usage data, personal data, etc.) are disclosed to the web service via selections, proposed additions, and/or additions. Optionally, in step 104, notice information and/or parameters are disclosed to the web service via selections, proposed additions, and/or additions. In step 106, at least one notice configuration file is created based on the disclosed tracking technologies. The notice configuration file(s) also may contain notice parameters, locations or regions associated with particular notice and consent regulation, and/or language preferences.

Step 108 may occur before, after, or during steps 102-106. In step 108, the SDK is delivered to the mobile app developer for integration with the mobile app, particularly the start-up code for the app. Like the mobile app itself, the SDK is written for a specific operating system. For example, the Android™ SDK may be written in Java and built using fragment technology; external libraries and components may be minimized to maximize compatibility of the SDK with mobile apps. The Android™ SDK may be provided to mobile app developers as an Android™ Archive file (*.aar) or a Java™ Archive file (*.jar). In another example, the iOS SDK may be written in Objective-C. The SDK may include documentation, such as sample code.

Figure 1B:
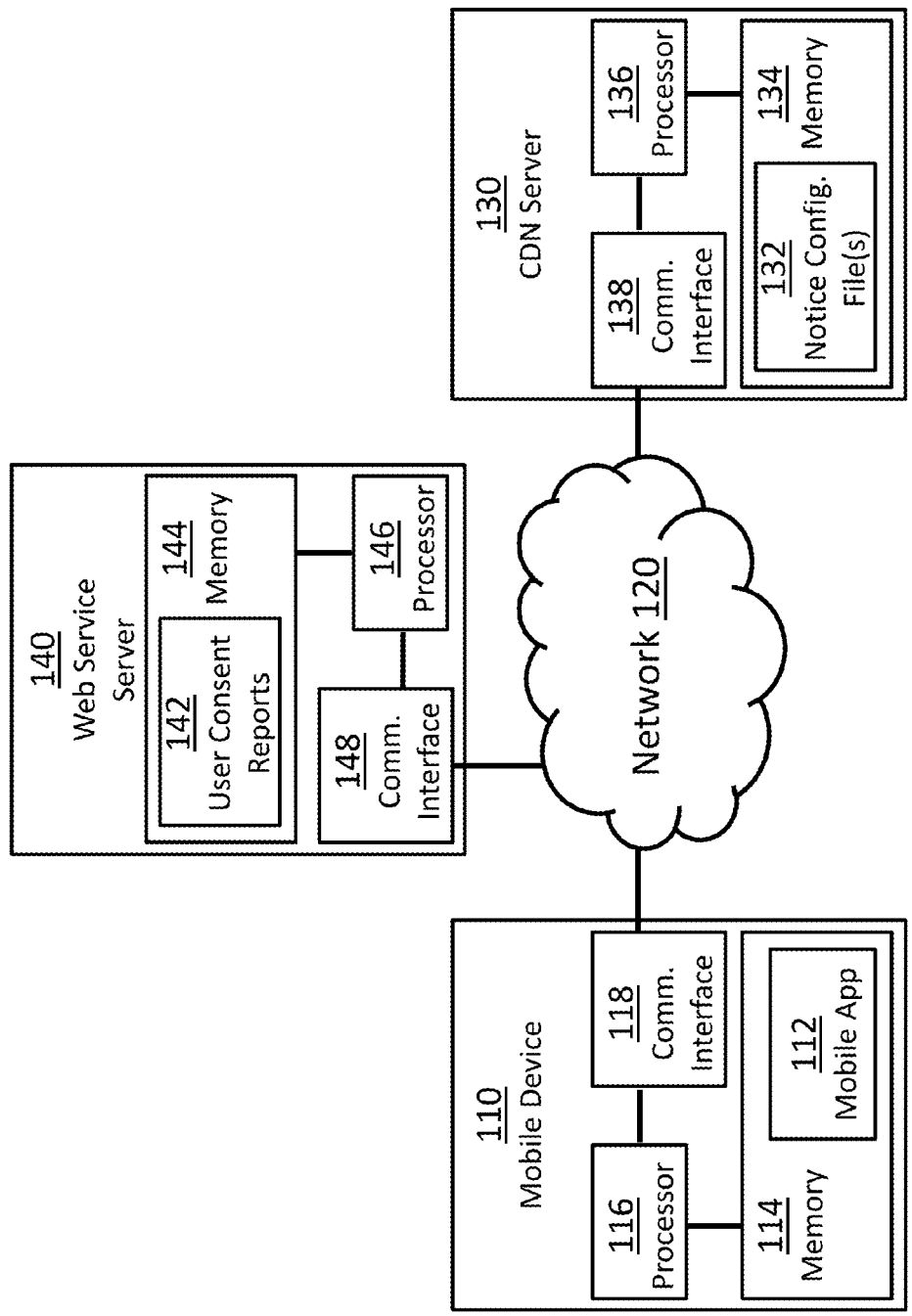
FIG. 1B is a network diagram illustrating communications between apparatus and systems in accordance with some embodiments.

FIG. 1B is a network diagram illustrating communications between apparatus and systems in accordance with some embodiments. As shown in FIG. 1B, a mobile device 110 has a mobile app 112 stored in memory 114. At least one processor 116 is in communication with the memory 114 and a communication interface 118, which connects the mobile device 110 to at least one network 120 (e.g., the Internet). The at least one network 120 is also connected to a content delivery network or content distribution network (CDN) server 130. The CDN server 130 has at least one notice configuration file 132 stored in memory 134, and at least one processor 136 in communication with the memory 134 and communication interface 138. The mobile device 110 received the SDK within the mobile app 112, and likewise CDN server 130 received the notice configuration file(s) 132, over the at least one network 120 from web service server 140. Web service server 140 stores user consent reports 142 in a memory 144 with at least one processor 146 in communication with the memory 144 and a communication interface 148.

As noted in FIG. 1A, the SDK provides functionality to the mobile app including, but not limited to, accessing notice configuration file(s); displaying notice information based on notice parameters, mobile device location, and/or user language preferences; and/or displaying options for giving implied consent, giving explicit consent, withdrawing consent, and/or manage notice and consent preferences.

Figure 2:
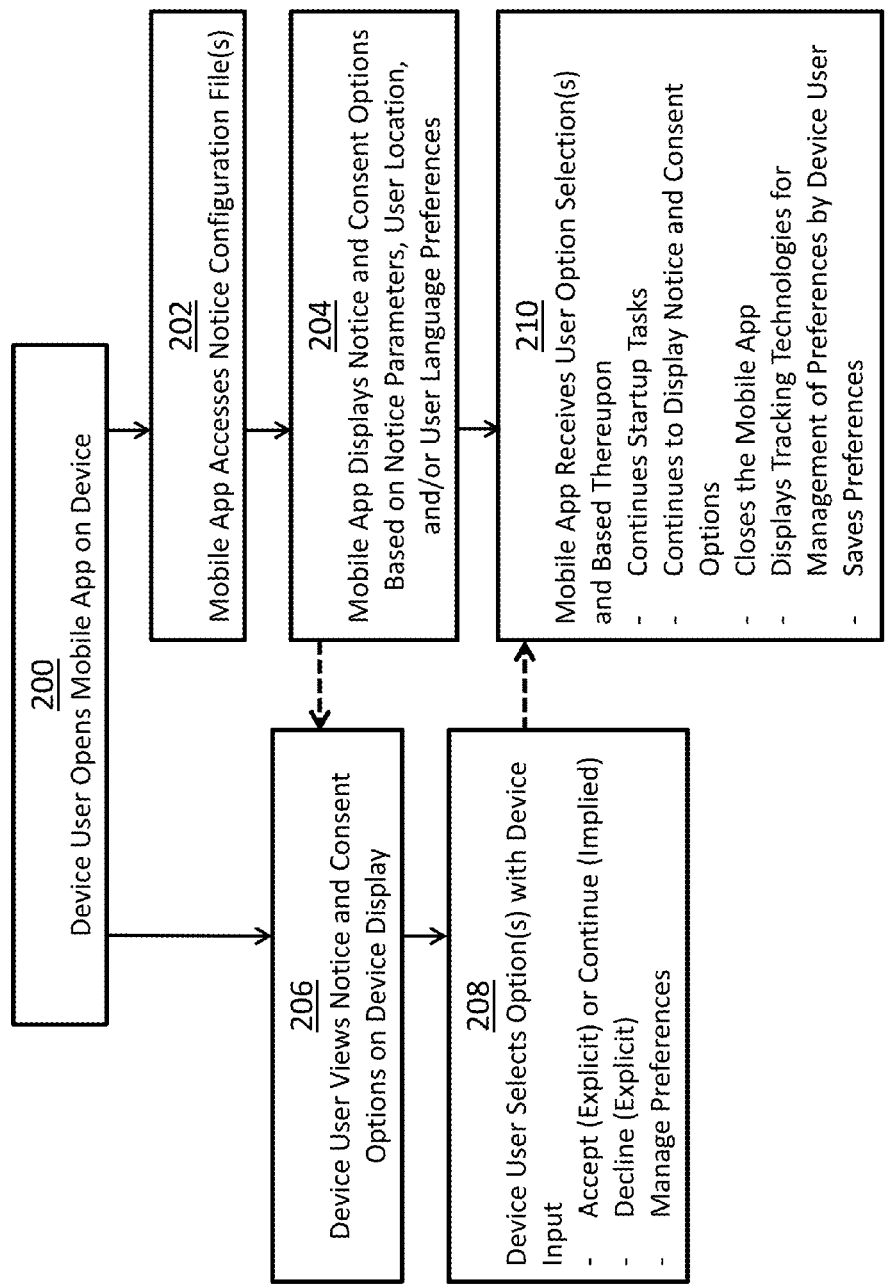
FIG. 2 is a flowchart illustrating a process for utilizing tracking notice and consent functionality in a mobile app in accordance with some embodiments.

FIG. 2 is a flowchart illustrating a process for utilizing tracking notice and consent functionality in a mobile app in accordance with some embodiments. In step 200, a mobile device user opens the mobile app on his or her mobile device. In step 202, the mobile app and/or SDK accesses a notice configuration file from, for example, a local CDN server. In step 204, the mobile app and/or SDK uses the information in the notice configuration file as well as the SDK to generate and display notice information and consent options. In step 206, the mobile device user views the notice information and consent options on at least one output device (e.g., a display) associated with the mobile device. In step 208, the mobile device user selects at least one option using at least one input device (e.g., a touchscreen) associated with the mobile device. In step 210, the mobile app and/or SDK receives the at least one selected option and, based on the selection, does one of continuing to the mobile application, displaying notice information and consent options, closing the mobile app, displaying tracking technologies for preference management by the mobile device user, and saving the preferences of the mobile device user.

When the SDK is included in a mobile app, the SDK may display information and a notice for implied consent to an end user (i.e., mobile device user) of the mobile app that the mobile app is using tracking technology. The end user may be presented with options to manage preferences relating to the tracking and/or continue on to the mobile app. The SDK notifies the mobile app of the end user's selections that were made in the SDK. This pathway requiring implied consent may be referred to as Path 1.

In some embodiments, when the SDK is included in a mobile app, the SDK displays information and a notice for explicit consent to an end user of the mobile app that the mobile app is using tracking technology. The end user may be presented with options to accept (thereby continuing on to the mobile app), decline (thereby closing the mobile app or redisplaying the information and/or the notice options), and/or manage preferences relating to the tracking. The SDK notifies the mobile app of the end user's selections that were made in the SDK. This pathway requiring explicit consent may be referred to as Path 2.

The SDK also may display a Privacy Policy dialog, a Terms of Use dialog, and/or a Manage Preferences dialog (e.g., a list of tracking technologies), from which an end user may choose to enable or disable each non-essential tracking technology.

In some embodiments, the SDK has an API that is used by the mobile app developer to initiate various features of the SDK, including starting Path 1, starting Path 2, directing access to a Privacy Policy dialog, a Terms of Use dialog, and/or a Manage Preferences dialog, and/or resetting the SDK. The SDK may record an end user's selections that were made in the SDK and/or the display count per session or over a predetermined time period (e.g., 30 days).

The SDK may be configurable by information from a web service and/or a mobile app developer. In some embodiments, a web service provides an object-oriented web based interface to a database server, utilized for example by another web server or by a mobile app. The SDK and the web service may communicate by transferring machine readable files, in formats such as Extensible Markup Language (XML) and JavaScript Object Notation (JSON). The mobile app is authenticated by the web service using a mobile app token (e.g., an API or SDK token), which may include a customer ID and/or a notice configuration ID.

A mobile app developer should identify any tracking technologies that collect user data for any purpose (including usage data, personal data, etc.). In some embodiments, first party tracking is disclosed. Third parties (i.e., vendors or partners) that track information also may be disclosed. A mobile app developer may submit tracking technologies associated with the mobile app to a web service. The tracking technologies may be communicated, for example, as submissions (e.g., a list) to and/or as selections from one or more preexisting lists stored by the web service. In one embodiment, a mobile app developer accesses a web interface, by which tracking technologies may be selected from a drop-down menu. If a tracking technology does not appear, the mobile app developer may submit the tracking technology for verification by the web service.

Figure 3:
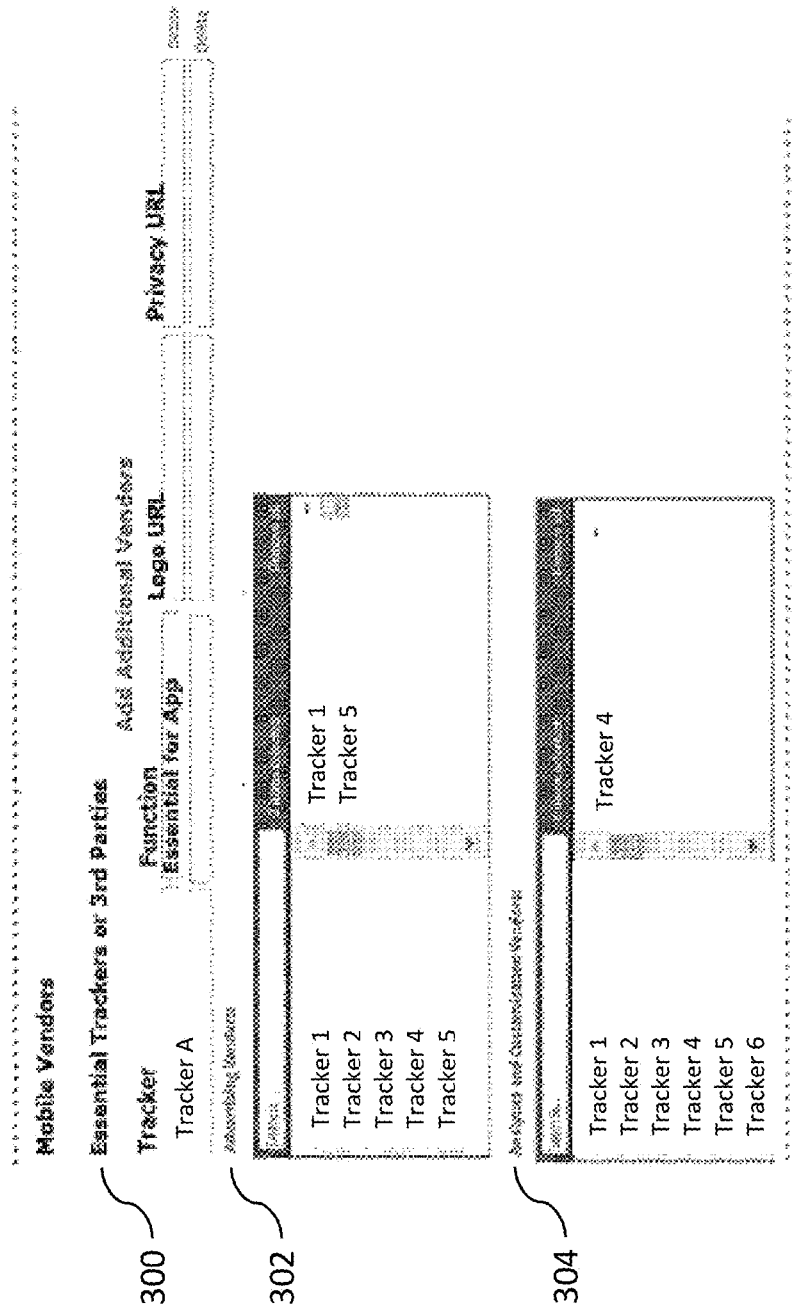
FIG. 3 is a screenshot illustrating disclosure of different tracking technologies associated with a mobile app in accordance with some embodiments.

FIG. 3 is a screenshot illustrating disclosure of different tracking technologies associated with a mobile app in accordance with some embodiments. The web interface includes a first section 300 for adding essential trackers or additional third party trackers. To add a tracker, the mobile app developer may provide a category, a name ("Tracker A"), a function ("Essential for App"), a logo Uniform Resource Locator (URL), and/or a privacy URL. Tracker categories are not limited but may include essential, advertising, and/or analytics. The web interface includes a first drop down menu 302 for advertising trackers, and a second drop down menu 304 for analytics trackers. In some embodiments, a web service maintains timely information regarding tracking technologies and updates changes to categories, names, functions, and URLs.

A web service may maintain at least one notice configuration file related to a mobile app/SDK. A notice configuration file may be a machine readable file, in XML- or JSON-format. In some embodiments, a notice configuration file includes timely details regarding the tracking technologies associated with the mobile app. For example, a web service may maintain a database server with tracker information, which is used to populate a notice configuration file for a mobile app. The database and notice configuration file may be updated more frequently than the mobile app. Also, a centralized source of tracker information allows a change in the information of a given tracker to be reflected more efficiently in multiple notice configuration files for multiple mobile apps for multiple mobile app developers. According to some embodiments, the applicable notice configuration file is read from a specific URL each time the SDK of the mobile app is initiated. For example, the tracker list is parsed from the notice configuration file at that time and stored in short-term mobile app memory to be used within that mobile app session.

A notice configuration file also may include other parameters for the display of information and a notice for consent to an end user of a mobile app. According to some embodiments, a mobile app developer selects or customizes one or more parameters related to the display of a notice on a mobile device upon startup of the mobile app. The parameters may be communicated, for example, as submissions (e.g., a list) to and/or as selections from one or more preexisting lists at a web service. In one embodiment, a mobile app developer accesses a web interface, by which one or more parameters may be selected from a menu. If a desired parameter does not appear, the mobile app developer may submit the desired parameter for inclusion by the web service in the notice configuration file to be maintained by the web service.

FIGS. 4A and 4B are computer program listings illustrating a notice configuration file for a mobile app in accordance with some embodiments. As shown in FIG. 4A, the file begins with numerous parameters 400 for display of the notice and consent information, such as colors, titles, sizes, fonts, etc. The file also includes the tracking technologies associated with the SDK, organized by category. This particular SDK is associated with two essential trackers 402. For each tracker, the file includes a name ("company-name") 404, a logo URL ("company-logo-url") 406, a description of the tracking technology ("company-daa-description") 408, and a privacy URL ("company-daa-link") 410. As shown in FIG. 4B, this SDK also is associated with two advertising trackers 412 and one analytics tracker 414.

Alternatively or in addition to including parameters in a notice configuration file, a mobile app developer may include and/or customize one or more parameters in the SDK and/or mobile app itself. Notice configuration parameters are not limited to but may include one or more of the parameters listed in TABLE 1, according to some embodiments.

In some embodiments, parameters also include content for display on a Privacy Policy dialog, a Terms of Use dialog, a Manage Preferences dialog (e.g., a list of tracking technologies), and/or a Tracker Detail dialog. Via the Manage Preferences dialog, an end user may have an option of enabling or disabling each non-essential tracking technology, including withdrawing previously given consent. Each tracker option may be presented as, for example, a toggle button.

FIGS. 5A-5F are computer program listings illustrating SDK integration in a mobile app in accordance with some embodiments. First, a mobile app developer copies the SDK into the mobile app library. Then, the developer adds the listing of activities shown in FIG. 5A to the mobile app configuration information. The SDK is integrated into the mobile app code by identifying an appropriate location (e.g., during the main/start-up activity) before any end user tracking or monitoring would begin, and including the listing shown in FIG. 5B. To start the implied consent flow, the SDK should follow the listing shown in FIG. 5C. To start the explicit consent flow, the SDK should follow the listing shown in FIG. 5E. Both the implied consent flow and the explicit consent flow may share inputs associated with the main/start-up activity as well as the SDK token, the configuration parameters (either in the SDK or a notice configuration file), and/or end user responses. Manage Preferences may be called by the listing shown in FIG. 5D. The SDK may be configured to skip the implied consent flow and/or explicit consent flows based on a saved end user

TABLE 1

| Parameter | Path 1 (Implied) | Path 2 (Explicit) |
| --- | --- | --- |
| Background color | X | X |
| Opacity setting | X (e.g., scale 0 to 100) | X (e.g., scale 0 to 100) |
| Title text | X (on, e.g., Path 1 introduction dialog and/or Path 1 information dialog) | X (on, e.g., Path 2 information dialog) |
| Title text color | X (on, e.g., Path 1 introduction dialog and/or Path 1 information dialog) | X (on, e.g., Path 2 information dialog) |
| Message text | X (e.g., Path 1 introduction dialog and/or Path 1 information dialog) | X (e.g., Path 2 information dialog) |
| Message text color | X (e.g., Path 1 introduction dialog and/or Path 1 information dialog) | X (e.g., Path 2 information dialog) |
| Message background color | X (e.g., Path 1 introduction dialog and/or Path 1 information dialog) | X (e.g., Path 2 information dialog) |
| Button text | X (e.g., Learn More button on Path 1 intro dialog; Close button on Path 1 intro dialog and/or Path 1 information dialog; Manage Preferences button on Path 1 intro dialogue and/or Path 1 information dialog) | X (e.g., Accept button and/or Decline button on Path 2 information dialog; Manage Preferences button on Path 2 information dialog) |
| Button text color | X (e.g., Learn More button on Path 1 intro dialog; Close button on Path 1 intro dialog and/or Path 1 information dialog; Manage Preferences button on Path 1 intro dialogue and/or Path 1 information dialog) | X (e.g., Accept button and/or Decline button on Path 2 information dialog; Manage Preferences button on Path 2 information dialog) |
| Button background color | X (e.g., Learn More button on Path 1 intro dialog; Close button on Path 1 intro dialog and/or Path 1 information dialog; Manage Preferences button on Path 1 intro dialogue and/or Path 1 information dialog) | X (e.g., Accept button and/or Decline button on Path 2 information dialog; Manage Preferences button on Path 2 information dialog) |
| Frequency | X (e.g., maximum times Path 1 should be initiated in, for example, a 30-day period) | X (e.g., maximum times Path 2 should be initiated in, for example, a 30-day period) | response, session count, time passage, etc. The dialogs may be reset by calling the listing shown in FIG. 5F.

In some embodiments, the SDK reports information about key events in the SDK flow to the web service. Information to be reported is not limited to but may include one or more of the sample structures listed in TABLE 2, according to some embodiments.

TABLE 2

| Event Notification URL | Event |
|---|---|
| http://placeholder.com/pub/p.gif?pid={0}&ocid=(1)&ii=1&mb=4 | Path 1 or Path 2 is initiated |
| http://placeholder.com/pub/p.gif?pid={0}&ocid=(1)&int=2&mb=1&d=1 | Learn More button from Path 1 introduction dialog is selected |
| http://placeholder.com/pub/p.gif?pid={0}&ocid=(1)&nt=4&mb=4&ic=1 | Manage Preferences button from the Path 1 information dialog is selected |
| http://placeholder.com/pub/p.gif?pid={0}&ocid=(1)&ii=1&mb=4&nt=3&d=1 | Manage Preferences button from the Path 2 information dialog is selected |
| http://placeholder.com/pub/p.gif?pid={0}&ocid=(1)&mb=4&nt=3&aa=0 | Accept button from the Path 2 information dialog is selected |
| http://placeholder.com/pub/p.gif?pid={0}&ocid=(1)&mb=4&nt=3&aa=0 | Decline button from the Path 2 information dialog is selected or the dialog is dismissed without selecting the Accept button |
| http://placeholder.com/pub/p.gif?pid={0}&ocid=(1)&mb=4&nt=3&aa=0 | Path Direct is initiated | where parameter {0} is the Product ID and parameter (1) is the Company ID.

Figure 6:
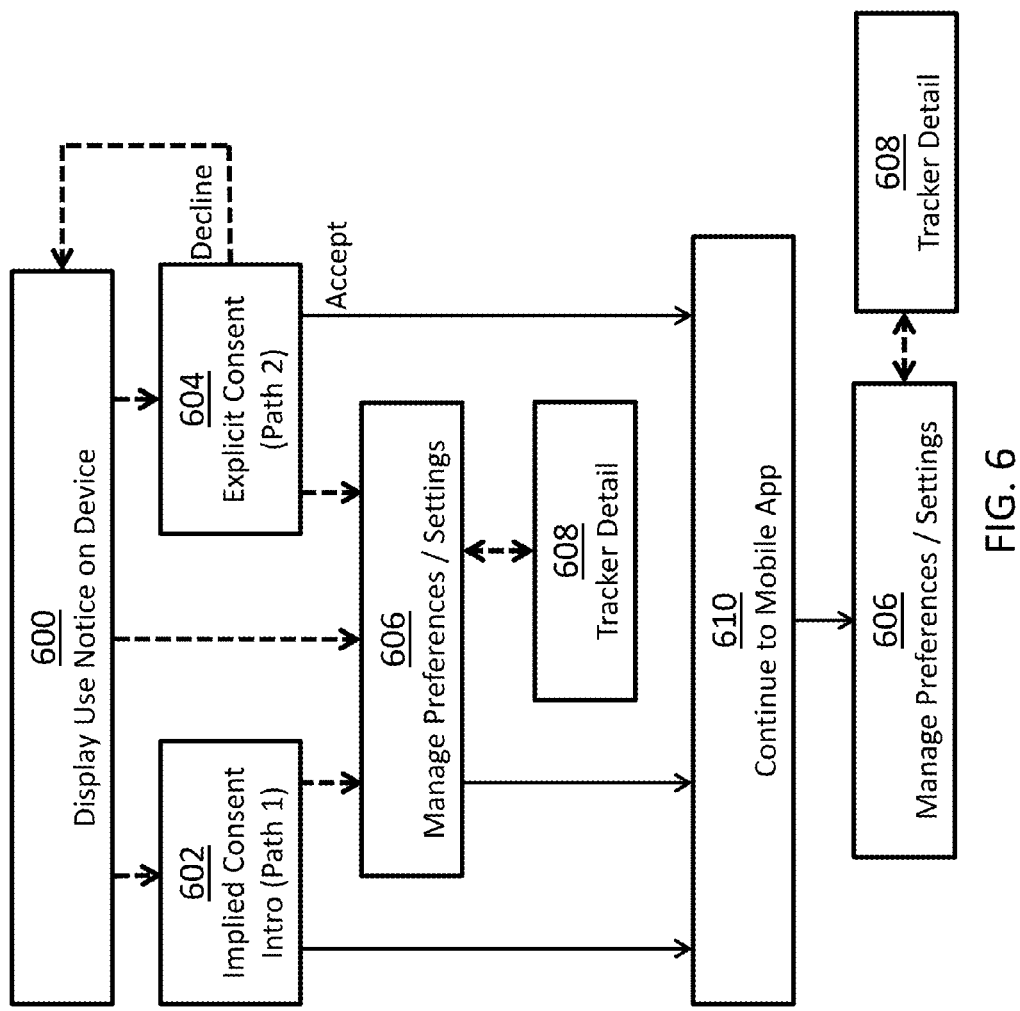
FIG. 6 is a flowchart illustrating notice and consent flows in a mobile app in accordance with some embodiments.

FIG. 6 is a flowchart illustrating notice and consent flows in a mobile app in accordance with some embodiments. When an end user opens a mobile app on a mobile device, in step 600, notice information is displayed to the end user on the mobile device. The notice information will take the form of either the implied consent flow (Path 1) 602 or the explicit consent flow (Path 2) 604. Regardless of which dialog occurs, in some embodiments, the end user may always select the Manage Preferences (or Settings) dialog 606, which includes a list of the tracking technologies associated with the app. The end user may select a tracking technology from the list to view a tracker detail dialog 608 with more information about the tracking technology and the ability to return to the Manage Preferences dialog 606.

If the SDK presents implied consent 602, the end user has the options to select the Manage Preferences dialog 606 or continue to the mobile app 610. Once in the mobile app, the end user may return to the Manage Preferences dialog 606 and tracker detail dialog 608 to review and/or change one or more settings relating to tracking technologies.

If the SDK presents explicit consent 604, the end user has the options to select the Manage Preferences dialog 606, accept and continue to the mobile app 610, or decline consent. Once in the mobile app, the end user may return to the Manage Preferences dialog 606 and tracker detail dialog 608 to withdraw consent.

Figure 7B:
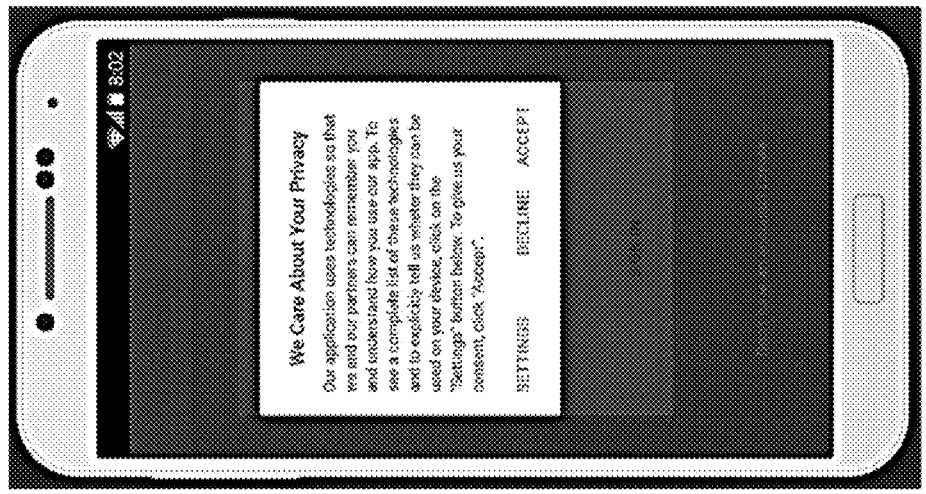
FIGS. 7A-7L are screenshots illustrating notice and consent flows in a mobile app in accordance with some embodiments.
Figure 7A:
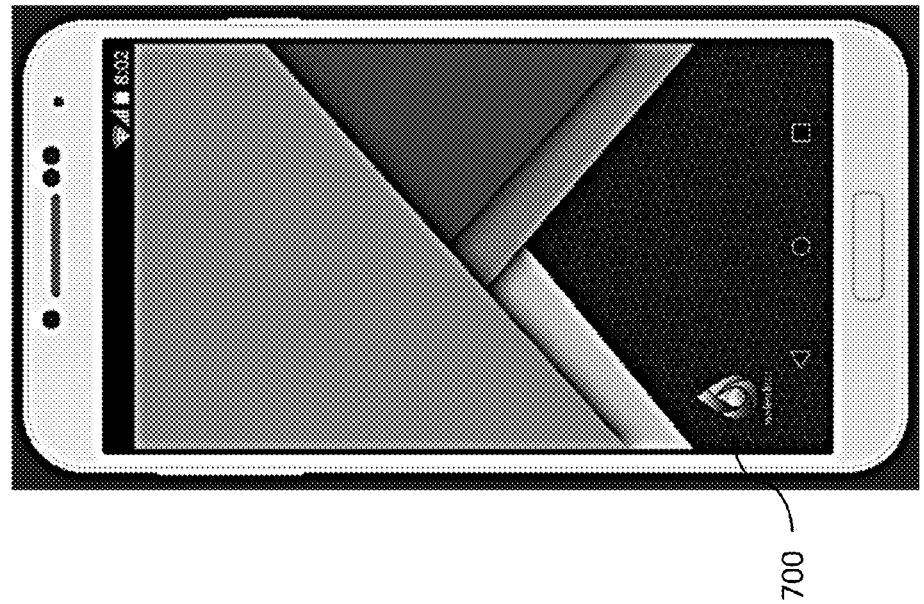

FIGS. 7A-7L are screenshots illustrating notice and consent flows in a mobile app in accordance with some embodiments. FIG. 7A shows a mobile device home screen with an icon 700 for a mobile app. When icon 700 is clicked and the mobile app opens, an explicit consent dialog appears in FIG. 7B with three options: "Settings," "Decline," or "Accept."

Figures 7C, 7D:
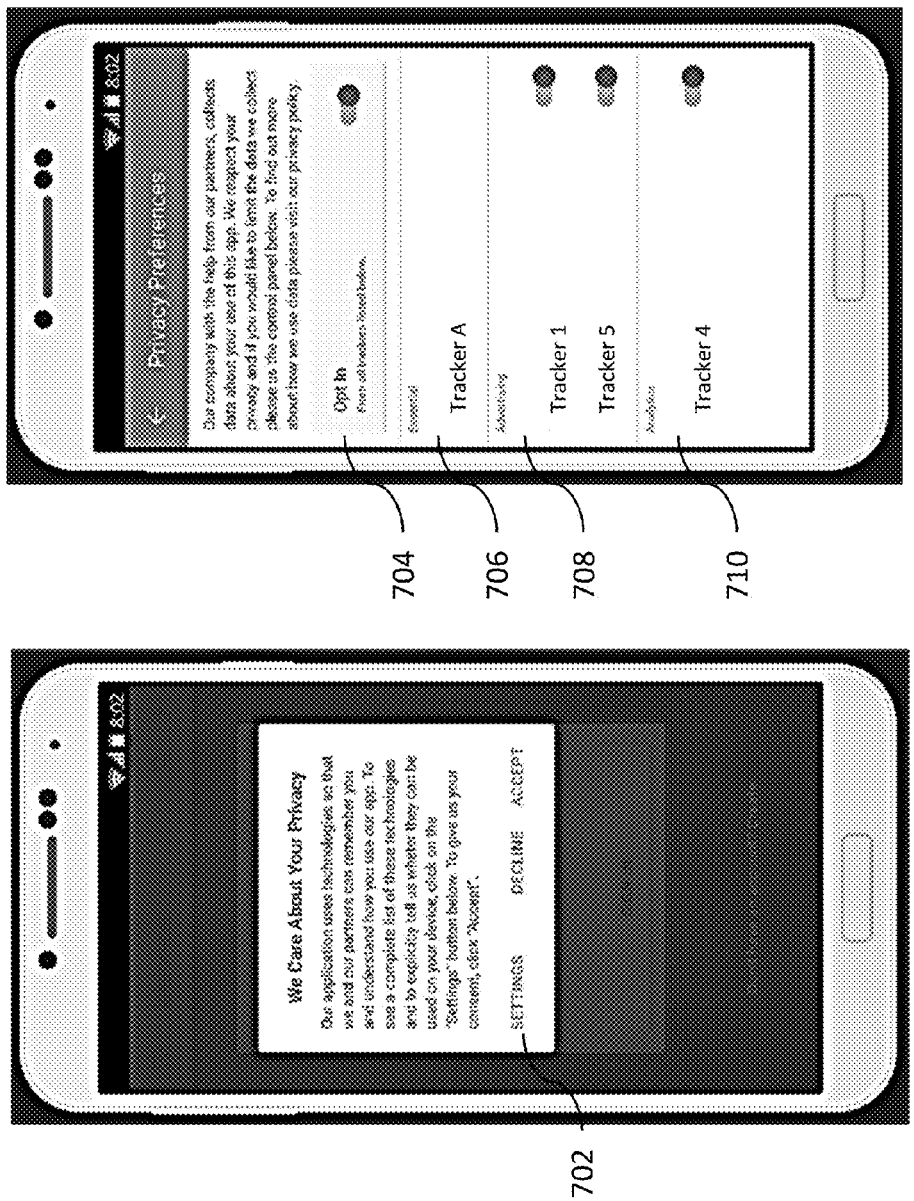
Figure 7F:
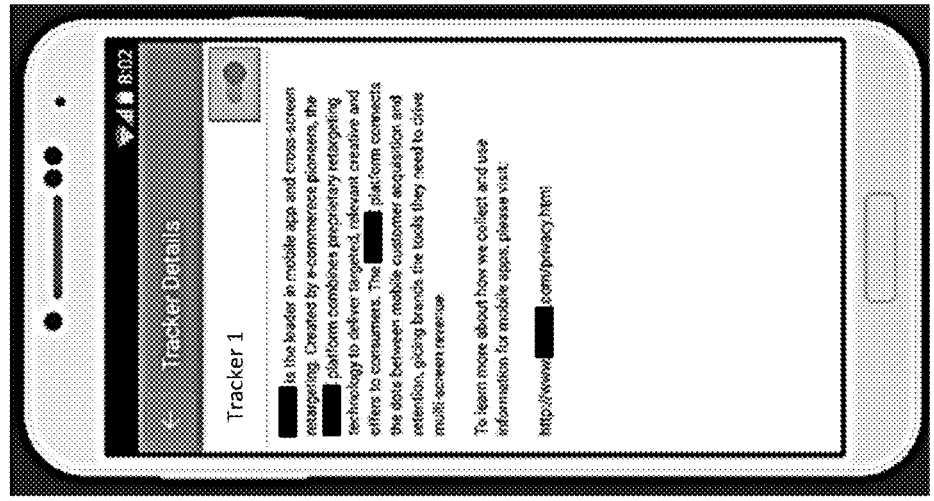
Figure 7E:
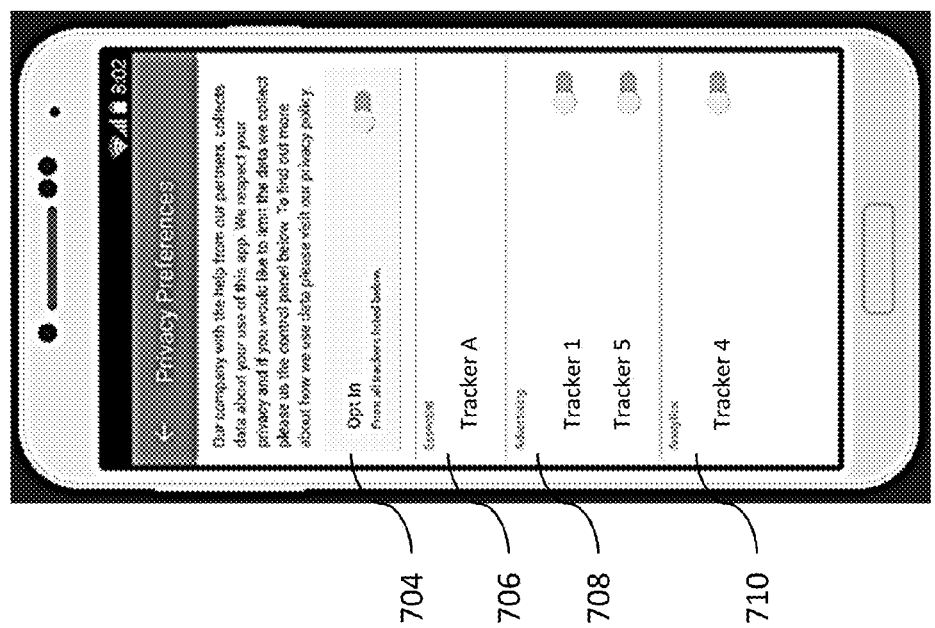

In FIG. 7C, option 702 is selected to open the Settings dialog in FIG. 7D. The Settings dialog includes a toggle switch to opt in or out from all listed tracking technologies 704. No toggle switch is provided for individual essential tracking technologies 706; however, individual advertising tracking technologies 708 and individual analytics tracking technologies 710 may be toggled on and off. In FIG. 7D, all of the toggle are on—the end user is opted in for all listed tracking technologies 704. But in FIG. 7E, all of the toggles are off—the end user is opted out from all listed tracking technologies 704. In FIG. 7E, "Tracker 1" is selected to open the Tracker Details dialog in FIG. 7F. The Tracker Details dialog includes information of the associated tracking technology and a link to more information.

Figure 7H:
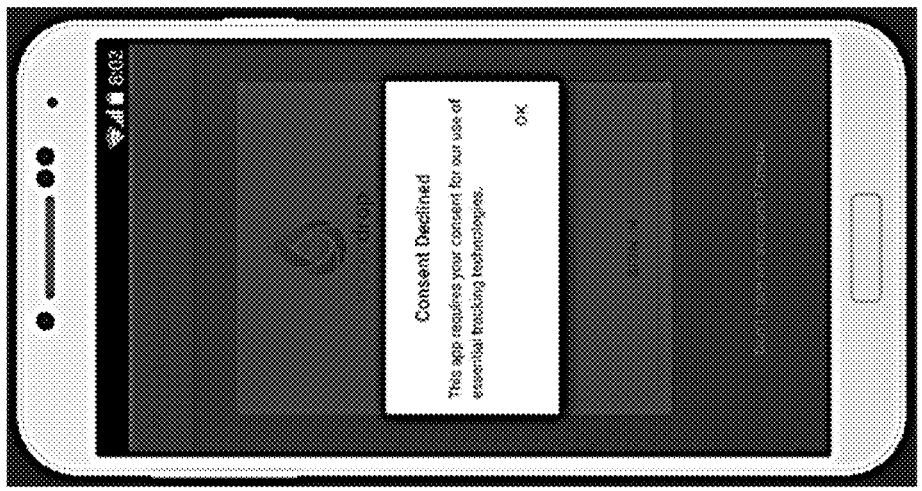
Figure 7G:
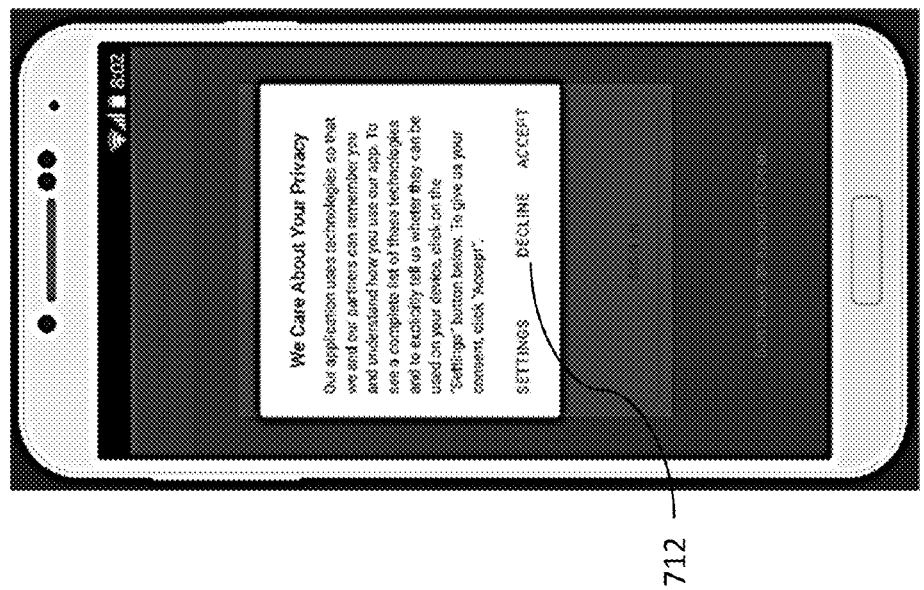

In FIG. 7G, option 712 is selected to decline consent, resulting in the dialog shown in FIG. 7H. Instead of or in addition to this dialog in FIG. 7H, which requires the end user to select okay to close the dialog, option 712 may be configured to return the end user to the privacy statement in FIG. 7G, close the app, and/or uninstall the app from the mobile device.

Figure 7I:
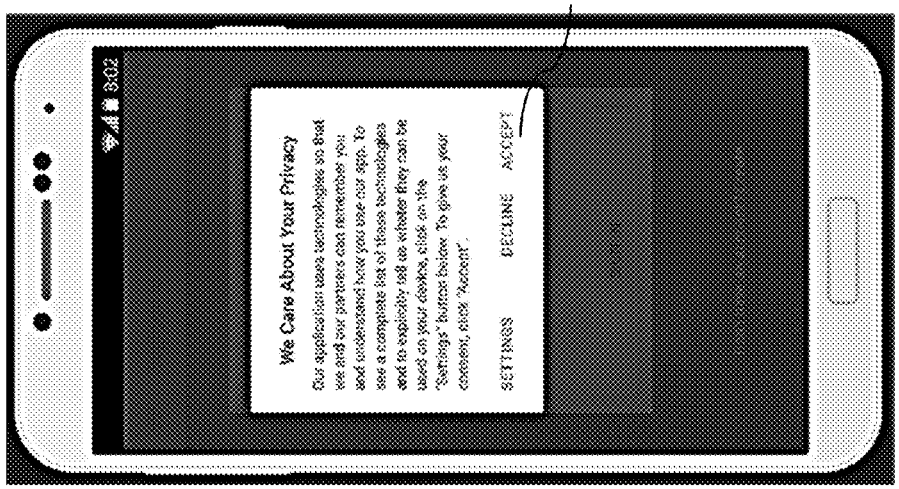
Figure 7J:
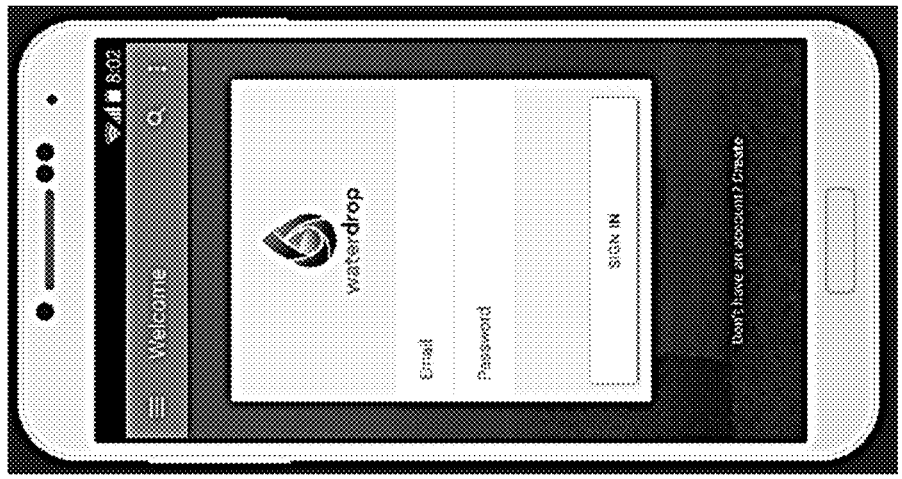
Figure 7L:
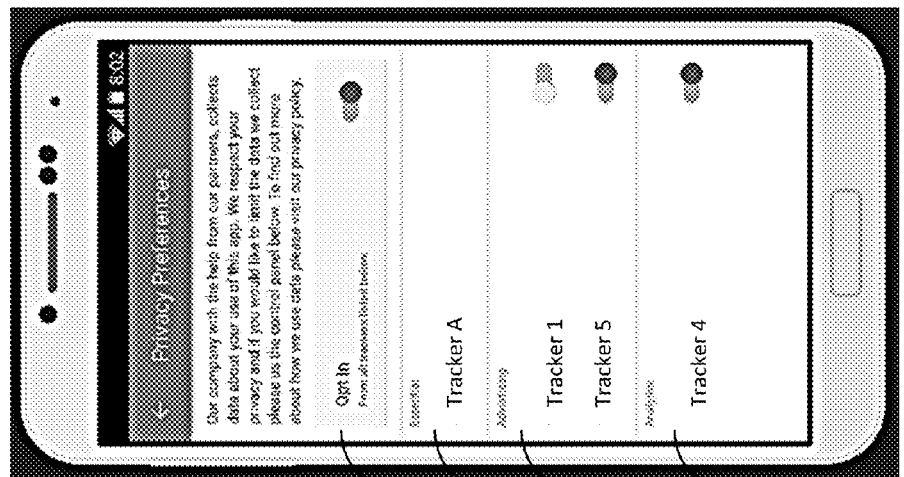
Figure 7K:
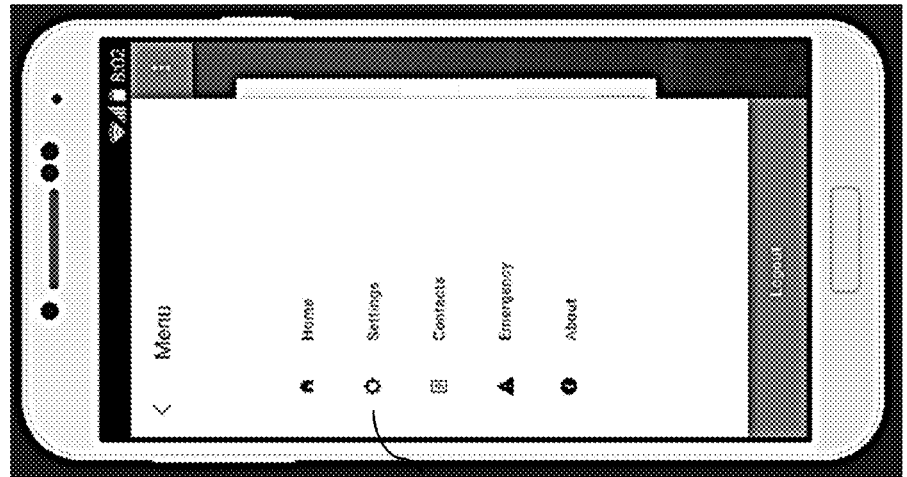

In FIG. 7I, option 714 is selected to accept or consent to the tracking technologies such that the mobile app continues as shown in FIG. 7J. Once in the app, however, the end user may use, for example, the mobile app Menu shown in FIG. 7K, to select Settings 716 and reopen the Setting dialog shown in FIG. 7L to adjust consent settings for all or some tracking technologies.

The effectiveness and/or legality of notice and consent may be affected by the location where the mobile app is being accessed and used. For example, a first region may require implied consent, but a second region may require explicit consent. A mobile app and/or SDK should detect the location of a mobile device user using the mobile app to determine whether the user is in the first region or the second region in order to determine whether implied consent or explicit consent is required. In some embodiments, the mobile app and/or SDK may default to an implied consent flow; however, if a mobile device user is detected opening the mobile app in the second region, the mobile app and/or SDK may override the implied consent flow with an explicit consent flow required for the detected region. In other embodiments, the mobile app and/or SDK may default to an explicit consent flow; however, if a mobile device user is detected opening the mobile app in the first region, the mobile app and/or SDK may not override the explicit consent flow with an implied consent flow even though implied consent is allowed for the detected region.

In some embodiments, a parameter for the SDK and/or notice configuration file is a reference to a geolocation of the mobile device user (e.g., country notice type). This parameter may be specified by country. For example, the web service may recommend a regional value and/or the mobile app developer may select a regional value for each country. In some embodiments, a regional value may be overridden by the mobile app developer.

A notice configuration file may be specific to a particular region. Multiple versions of a notice configuration file may be created for one mobile app to accommodate different language preferences and/or regulatory regions, depending on where a mobile device user initiates or opens the mobile app. Once region-specific notice configuration files that represent the client-specified parameters are created, the notice configuration files are distributed to and stored on applicable regional servers of a CDN, such as a global application delivery platform (e.g., Akamai® Intelligent Platform™, Akamai Technologies, Inc., Cambridge, Mass.). Each notice configuration file may be stored on a regional CDN server that corresponds to the particular region specified in the notice configuration file. Alternatively, each regional CDN server may store a plurality of notice configuration files for a plurality of regions. Regardless, the appropriate notice configuration file is already residing at the appropriate CDN server in accordance with some embodiments.

When a mobile device user initiates a mobile app, a notice configuration file will be read from a regional CDN server. Thus, when an SDK in a mobile app requests the notice configuration file from the regional CDN server, the notice configuration file may correspond to the regional location of the mobile device. The CDN server may provide a region for the current region of the mobile device user based on the device IP address and send the notice configuration file. The SDK, in turn, may determine the type of flow to begin (i.e., implied consent versus explicit consent) based on the parameter in the notice configuration file.

In some embodiments, the mobile app and/or SDK may be provided with access to information collected by or stored on a mobile device, including, but not limited to, language preferences, satellite navigation (e.g., GPS), Assisted GPS (A-GPS), and the MAC address, which is broadcast when a mobile device searches for a Wi-Fi network.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory computer-readable storage medium encoded with processor-executable instructions that, when executed by at least one processor of a mobile device, perform a method of providing notice, to a user of the mobile device, of a presence of at least one tracker in a mobile app when the mobile app is initiated on the mobile device, and recording an indication of consent by the user to the presence of the at least one tracker in the mobile app, the method comprising:
  A) after initiation by the user of the mobile app resident on the mobile device, transmitting, from the mobile device to a first content delivery network (CDN) server, at least one mobile app token for the mobile app;
  B) receiving at the mobile device from the first CDN server, in response to A) and based on the at least one mobile app token, a notice configuration file for the mobile app, wherein the notice configuration file comprises tracker information for the at least one tracker in the mobile app;
  C) based on the tracker information in the notice configuration file received in B) from the first CDN server, and prior to execution of the at least one tracker in the mobile app:
    C1) rendering at least one graphical user interface (GUI) on the mobile device to inform the user of the mobile device of the presence of the at least one tracker in the mobile app, the at least one GUI including at least one user-selectable button to allow the user to specify either:
      a first user option to access a tracker list based on the tracker information in the notice configuration file received in B), so as to manage user preferences regarding the at least one tracker in the mobile app; or
      a second user option to bypass the tracker list; and
    C2) receiving one of the first user option and the second user option via the at least one GUI on the mobile device; and
  D) transmitting, from the mobile device to a privacy management server, user consent information regarding the one of the first option and the second option received in C2) so as to record the indication of consent by the user to the presence of the at least one tracker in the mobile app,
  wherein:
  the notice configuration file received in B) from the first CDN server further comprises a jurisdiction notice type parameter indicating one of an implied notice/consent GUI workflow and an explicit notice/consent GUI workflow based on a current geographic location of the mobile device; and
  C) comprises performing the one of the implied notice/consent GUI workflow and the explicit notice/consent GUI workflow based on the jurisdiction notice type parameter in the notice configuration file, wherein:
  the implied notice/consent GUI workflow comprises:
    when in C2) the second user option to bypass the tracker list is received via the at least one GUI, the method further comprises continuing execution of the mobile app after D); and
  the explicit notice/consent workflow comprises:
    when in C2) the second user option to bypass the tracker list is received via the at least one GUI, the method further comprises, after D), one of: prohibiting further execution of the mobile app; and disabling all trackers of the at least one tracker prior to continuing execution of the mobile app.

2. The computer-readable storage medium of claim 1, wherein the processor-executable instructions are included in the mobile app, and wherein the computer-readable storage medium stores the mobile app.

3. The computer-readable storage medium of claim 1, wherein:
the at least one tracker present in the mobile app includes a plurality of trackers present in the mobile app;
in B), the notice configuration file received from the first CDN server includes corresponding tracker information for each tracker of the plurality of trackers present in the mobile app; and
in C), the tracker list is based on the corresponding tracker information for each tracker of the plurality of trackers present in the mobile app.

4. The computer-readable storage medium of claim 3, wherein for each tracker of the plurality of trackers present in the mobile app, the corresponding tracker information in the notice configuration file received in B) comprises:
a tracker category;
a tracker name;
a tracker function description; and
a privacy Uniform Resource Locator (URL) for a privacy policy associated with the tracker.

5. The computer-readable storage medium of claim 4, wherein the tracker category includes one of essential, advertising, and analytics.

6. The computer-readable storage medium of claim 4, wherein:
in C1), the at least one GUI includes a first GUI to allow the user to specify the first user option or the second user option;
when in C2) the first user option is received, C) further comprises:
C3) rendering a second GUI on the mobile device to provide the tracker list to the user so as to manage the user preferences, wherein the second GUI includes:
respective tracker names for the plurality of trackers, based on the corresponding tracker information for each tracker; and
for at least some of the respective tracker names, corresponding toggle buttons to allow the user to specify respective tracker consent options to either enable or disable corresponding trackers represented by the respective tracker names.

7. The computer-readable storage medium of claim 6, wherein:
when in C2) the first user option is received, C) further comprises:
C4) receiving, via the second GUI, at least one tracker consent option of the respective tracker consent options; and
in D), the user consent information transmitted to the privacy management server further comprises the at least one tracker consent option received in C4).

8. The computer-readable storage medium of claim 6, wherein:
for each tracker, the corresponding tracker information in the notice configuration file received in B) comprises a logo uniform resource locator (URL) for a logo associated with the tracker; and C3) further comprises:
retrieving at the mobile device the logo for each tracker of the plurality of trackers based on the logo URL in the corresponding tracker information from the notice configuration file received in B); and
including in the second GUI the retrieved logo as the tracker name for each tracker.

9. The computer-readable storage medium of claim 6, wherein in C3) the second GUI is rendered on the mobile device so as to arrange the tracker name for each tracker of the plurality of trackers based on the tracker category specified in the corresponding tracker information in the notice configuration file received in B).

10. The computer-readable storage medium of claim 9, wherein:
a first tracker of the plurality of trackers has a tracker category of essential; and
in C3), the second GUI includes a first tracker name for the first tracker of the plurality of trackers but does not include a first corresponding toggle button to allow the user to either enable or disable the first tracker, so as to prohibit disabling of the first tracker.

11. The computer-readable storage medium of claim 6, wherein when the user selects a first tracker name of the respective tracker names in the second GUI, C) further comprises:
C4) rendering a third GUI on the mobile device that includes:
the tracker function description associated with the first tracker name in the corresponding tracker information; and
the privacy URL associated with the first tracker name in the corresponding tracker information.

12. The computer-readable storage medium of claim 11, wherein:
for each tracker, the corresponding tracker information in the notice configuration file received in B) comprises a logo uniform resource locator (URL) for a logo associated with the tracker; and
C4) further comprises:
retrieving at the mobile device a first logo based on a first logo URL associated with the first tracker name in the corresponding tracker information from the notice configuration file received in B); and
including in the third GUI the retrieved first logo.

13. The computer-readable storage medium of claim 1, wherein:
the at least one tracker present in the mobile app includes a plurality of trackers present in the mobile app;
in B), the notice configuration file received from the first CDN server includes corresponding tracker information for each tracker of the plurality of trackers present in the mobile app;
in C), the tracker list is based on the corresponding tracker information for each tracker of the plurality of trackers present in the mobile app;
in C1), the at least one GUI includes a first GUI to allow the user to specify the first user option or the second user option; and
when in C2) the first user option is received, C) further comprises:
C3) rendering a second GUI on the mobile device to provide the tracker list to the user so as to manage the user preferences, wherein the second GUI includes:
respective tracker names for the plurality of trackers, based on the corresponding tracker information for each tracker; and for at least some of the respective tracker names, corresponding toggle buttons to allow the user to specify respective tracker consent options to either enable or disable corresponding trackers represented by the respective tracker names.

14. The computer-readable storage medium of claim 13, wherein:
when in C2) the first user option is received, C) further comprises:
C4) receiving, via the second GUI, at least one tracker consent option of the respective tracker consent options; and
in D), the user consent information transmitted to the privacy management server further comprises the at least one tracker consent option received in C4).

15. A method, comprising:
transmitting, from a mobile app server to a mobile device, a mobile app including processor-executable instructions that, when executed by at least one processor of the mobile device, perform a tracker notice method of providing notice, to a user of the mobile device, of a presence of at least one tracker in the mobile app, and recording an indication of consent by the user to the presence of the at least one tracker in the mobile app, the tracker notice method comprising:
A) after initiation by the user of the mobile app resident on the mobile device, transmitting, from the mobile device to a first content delivery network (CDN) server, at least one mobile app token for the mobile app;
B) receiving at the mobile device from the first CDN server, in response to A) and based on the at least one mobile app token, a notice configuration file for the mobile app, wherein the notice configuration file comprises tracker information for the at least one tracker in the mobile app;
C) based on the tracker information in the notice configuration file received in B) from the first CDN server, and prior to execution of the at least one tracker in the mobile app:
C1) rendering at least one graphical user interface (GUI) on the mobile device to inform the user of the mobile device of the presence of the at least one tracker in the mobile app, the at least one GUI including at least one user-selectable button to allow the user to specify either: a first user option to access a tracker list based on the tracker information in the notice configuration file received in B), so as to manage user preferences regarding the at least one tracker in the mobile app; or a second user option to bypass the tracker list; and
C2) receiving one of the first user option and the second user option via the at least one GUI on the mobile device; and
D) transmitting, from the mobile device to a privacy management server, user consent information regarding the one of the first option and the second option received in C2) so as to record the indication of consent by the user to the presence of the at least one tracker in the mobile app,
wherein:
the notice configuration file received in B) from the first CDN server further comprises a jurisdiction notice type parameter indicating one of an implied notice/consent GUI workflow and an explicit notice/consent GUI workflow based on a current geographic location of the mobile device; and C) comprises performing the one of the implied notice/consent GUI workflow and the explicit notice/consent GUI workflow based on the jurisdiction notice type parameter in the notice configuration file, wherein:
the implied notice/consent GUI workflow comprises:
when in C2) the second user option to bypass the tracker list is received via the at least one GUI, the method further comprises continuing execution of the mobile app after D); and
the explicit notice/consent workflow comprises:
when in C2) the second user option to bypass the tracker list is received via the at least one GUI, the method further comprises, after D), one of: prohibiting further execution of the mobile app; and disabling all trackers of the at least one tracker prior to continuing execution of the mobile app.

16. A method of providing notice, to a user of a mobile device, of a presence of at least one tracker in a mobile app when the mobile app is initiated by the user on the mobile device, and recording an indication of consent by the user to the presence of the at least one tracker in the mobile app, the method comprising:
A) after initiation by the user of the mobile app resident on the mobile device, transmitting, from the mobile device to a first content delivery network (CDN) server, at least one mobile app token for the mobile app;
B) receiving at the mobile device from the first CDN server, in response to A) and based on the at least one mobile app token, a notice configuration file for the mobile app, wherein the notice configuration file comprises tracker information for the at least one tracker in the mobile app;
C) based on the tracker information in the notice configuration file received in B) from the first CDN server, and prior to execution of the at least one tracker in the mobile app:
C1) rendering at least one graphical user interface (GUI) on the mobile device to inform the user of the mobile device of the presence of the at least one tracker in the mobile app, the at least one GUI including at least one user-selectable button to allow the user to specify either:
a first user option to access a tracker list based on the tracker information in the notice configuration file received in B), so as to manage user preferences regarding the at least one tracker in the mobile app; or
a second user option to bypass the tracker list; and
C2) receiving one of the first user option and the second user option via the at least one GUI on the mobile device; and
D) transmitting, from the mobile device to a privacy management server, user consent information regarding the one of the first option and the second option received in C2) so as to record the indication of consent by the user to the presence of the at least one tracker in the mobile app,
wherein:
the notice configuration file received in B) from the first CDN server further comprises a jurisdiction notice type parameter indicating one of an implied notice/consent GUI workflow and an explicit notice/consent GUI workflow based on a current geographic location of the mobile device; and
C) comprises performing the one of the implied notice/consent GUI workflow and the explicit notice/consent GUI workflow based on the jurisdiction notice type parameter in the notice configuration file, wherein:

the implied notice/consent GUI workflow comprises:
when in C2) the second user option to bypass the tracker list is received via the at least one GUI, the method further comprises continuing execution of the mobile app after D); and the explicit notice/consent workflow comprises:
when in C2) the second user option to bypass the tracker list is received via the at least one GUI, the method further comprises, after D), one of: prohibiting further execution of the mobile app; and disabling all trackers of the at least one tracker prior to continuing execution of the mobile app.

17. The method of claim 16, wherein:
the at least one tracker present in the mobile app includes a plurality of trackers present in the mobile app;
in B), the notice configuration file received from the first CDN server includes corresponding tracker information for each tracker of the plurality of trackers present in the mobile app; and
in C), the tracker list is based on the corresponding tracker information for each tracker of the plurality of trackers present in the mobile app.

18. The method of claim 17, wherein for each tracker of the plurality of trackers present in the mobile app, the corresponding tracker information in the notice configuration file received in B) comprises:
a tracker category;
a tracker name;
a tracker function description; and
a privacy Uniform Resource Locator (URL) for a privacy policy associated with the tracker.

19. The method of claim 18, wherein the tracker category includes one of essential, advertising, and analytics.

20. The method of claim 18, wherein:
in C1), the at least one GUI includes a first GUI to allow the user to specify the first user option or the second user option;
when in C2) the first user option is received, C) further comprises:
C3) rendering a second GUI on the mobile device to provide the tracker list to the user so as to manage the user preferences, wherein the second GUI includes:
respective tracker names for the plurality of trackers, based on the corresponding tracker information for each tracker; and
for at least some of the respective tracker names, corresponding toggle buttons to allow the user to specify respective tracker consent options to either enable or disable corresponding trackers represented by the respective tracker names.

21. The method of claim 20, wherein:
C) further comprises:
C4) receiving, via the second GUI, at least one tracker consent option of the respective tracker consent options; and
in D), the user consent information transmitted to the privacy management server further comprises the at least one tracker consent option received in C4).

22. The method of claim 20, wherein:
for each tracker, the corresponding tracker information in the notice configuration file received in B) comprises a logo uniform resource locator (URL) for a logo associated with the tracker; and C3) further comprises:
retrieving at the mobile device the logo for each tracker of the plurality of trackers based on the logo URL in the corresponding tracker information from the notice configuration file received in B); and
including in the second GUI the retrieved logo as the tracker name for each tracker.

23. The method of claim 20, wherein in C3) the second GUI is rendered on the mobile device so as to arrange the tracker name for each tracker of the plurality of trackers based on the tracker category specified in the corresponding tracker information in the notice configuration file received in B).

24. The method of claim 23, wherein:
a first tracker of the plurality of trackers has a tracker category of essential; and
in C3), the second GUI includes a first tracker name for the first tracker of the plurality of trackers but does not include a first corresponding toggle button to allow the user to either enable or disable the first tracker, so as to prohibit disabling of the first tracker.

25. The method of claim 20, wherein when the user selects a first tracker name of the respective tracker names in the second GUI, C) further comprises:
C4) rendering a third GUI on the mobile device that includes:
the tracker function description associated with the first tracker name in the corresponding tracker information; and
the privacy URL associated with the first tracker name in the corresponding tracker information.

26. The method of claim 25, wherein:
for each tracker, the corresponding tracker information in the notice configuration file received in B) comprises a logo uniform resource locator (URL) for a logo associated with the tracker; and
C4) further comprises:
retrieving at the mobile device a first logo based on a first logo URL associated with the first tracker name in the corresponding tracker information from the notice configuration file received in B); and
including in the third GUI the retrieved first logo.

27. The method of claim 18, wherein when in C2) the second user option to bypass the tracker list is received via the at least one GUI, the method further comprises:
continuing execution of the mobile app.

28. The method of claim 18, wherein when in C2) the second user option to bypass the tracker list is received via the at least one GUI, the method further comprises, after D), one of:
prohibiting further execution of the mobile app; and
disabling all trackers of the at least one tracker prior to continuing execution of the mobile app.

29. The method of claim 18, wherein:
the notice configuration file received in B) from the first CDN server further comprises a jurisdiction notice type parameter indicating one of an implied notice/consent GUI workflow and an explicit notice/consent GUI workflow based on a current geographic location of the mobile device; and
C) comprises performing the one of the implied notice/consent GUI workflow and the explicit notice/consent GUI workflow based on the jurisdiction notice type parameter in the notice configuration file, wherein:
the implied notice/consent GUI workflow comprises:
when in C2) the second user option to bypass the tracker list is received via the at least one GUI, the method further comprises continuing execution of the mobile app; and the explicit notice/consent workflow comprises:
when in C2) the second user option to bypass the tracker list is received via the at least one GUI, the method further comprises, after D), one of:
prohibiting further execution of the mobile app; and
disabling all trackers of the at least one tracker prior to continuing execution of the mobile app.

30. The method of claim 29, wherein:
the at least one tracker present in the mobile app includes a plurality of trackers present in the mobile app;
in B), the notice configuration file received from the first CDN server includes corresponding tracker information for each tracker of the plurality of trackers present in the mobile app;
in C), the tracker list is based on the corresponding tracker information for each tracker of the plurality of trackers present in the mobile app;
in C1), the at least one GUI includes a first GUI to allow the user to specify the first user option or the second user option; and
when in C2) the first user option is received, C) further comprises:
C3) rendering a second GUI on the mobile device to provide the tracker list to the user so as to manage the user preferences, wherein the second GUI includes:
respective tracker names for the plurality of trackers, based on the corresponding tracker information for each tracker; and
for at least some of the respective tracker names, corresponding toggle buttons to allow the user to specify respective tracker consent options to either enable or disable corresponding trackers represented by the respective tracker names.

31. The method of claim 30, wherein:
when in C2) the first user option is received, C) further comprises:
C4) receiving, via the second GUI, at least one tracker consent option of the respective tracker consent options; and
in D), the user consent information transmitted to the privacy management server further comprises the at least one tracker consent option received in C4).

32. A mobile device, comprising:
at least one communication interface;
a display device;
at least one memory storing at least one mobile app including processor-executable instructions; and
at least one processor coupled to the at least one communication interface, the at least one display device, and the at least one memory, wherein upon execution by the at least one processor of the mobile app including the processor-executable instructions, the at least one processor:
A) after initiation of the mobile app by a user of the mobile device, controls the at least one communication interface to transmit, to a first content delivery network (CDN) server, at least one mobile app token for the mobile app;
B) controls the at least one communication interface to receive from the first CDN server, in response to A) and based on the at least one mobile app token, a notice configuration file for the mobile app, wherein the notice configuration file comprises tracker information for at least one tracker in the mobile app;
C) based on the tracker information in the notice configuration file received in B) from the first CDN server, and prior to execution of the at least one tracker in the mobile app:
C1) controls the display device to render at least one graphical user interface (GUI) to inform the user of the mobile device of a presence of the at least one tracker in the mobile app, the at least one GUI including at least one user-selectable button to allow the user to specify either:
a first user option to access a tracker list based on the tracker information in the notice configuration file received in B), so as to manage user preferences regarding the at least one tracker in the mobile app; or
a second user option to bypass the tracker list; and
C2) receives one of the first user option and the second user option via the at least one GUI; and
D) controls the at least one communication interface to transmit, to a privacy management server, user consent information regarding the one of the first option and the second option received in C2) so as to record an indication of consent by the user to the presence of the at least one tracker in the mobile app,
wherein:
the notice configuration file received in B) from the first CDN server further comprises a jurisdiction notice type parameter indicating one of an implied notice/consent GUI workflow and an explicit notice/consent GUI workflow based on a current geographic location of the mobile device; and
C) comprises performing the one of the implied notice/consent GUI workflow and the explicit notice/consent GUI workflow based on the jurisdiction notice type parameter in the notice configuration file, wherein:
the implied notice/consent GUI workflow comprises:
when in C2) the second user option to bypass the tracker list is received via the at least one GUI, the method further comprises continuing execution of the mobile app after D); and
the explicit notice/consent workflow comprises:
when in C2) the second user option to bypass the tracker list is received via the at least one GUI, the method further comprises, after D), one of: prohibiting further execution of the mobile app; and disabling all trackers of the at least one tracker prior to continuing execution of the mobile app.

33. A non-transitory computer-readable storage medium encoded with processor-executable instructions that, when executed by at least one processor, perform a method of providing notice, to a user of a mobile device, of a presence of at least one tracker in a mobile app resident on the mobile device, the method comprising:
A) after initiation by the user of the mobile app resident on the mobile device, transmitting, from the mobile device to a first content delivery network (CDN) server, at least one mobile app token for the mobile app;
B) receiving at the mobile device, from the first CDN server, in response to A) and based on the at least one mobile app token, a notice configuration file for the mobile app, wherein the notice configuration file comprises a jurisdiction notice type parameter indicating one of an implied notice/consent GUI workflow and an explicit notice/consent GUI workflow based on a current geographic location of the mobile device;
C) based on the jurisdiction notice type parameter in the notice configuration file received from the first CDN server, performing the one of the implied notice/consent GUI workflow and the explicit notice/consent GUI workflow prior to execution of the at least one tracker in the mobile app, wherein:

C1) the implied notice/consent GUI workflow comprises:

C1a) providing a first graphical user interface (GUI) on the mobile device to allow the user to select a first option to accept or to select a second option to decline information regarding the at least one tracker in the mobile app;

C1b) when the user selects the second option to decline the information regarding the at least one tracker in the mobile app, continuing execution of the mobile app; and C1c) when the user selects the first option to accept the information regarding the at least one tracker in the mobile app, providing a second GUI on the mobile device to allow the user to select a third option to opt-in or opt-out of the at least one tracker in the mobile app; and C2) the explicit notice/consent GUI workflow comprises:

C2a) providing a third GUI on the mobile device to allow the user to select a fourth option to accept or to select a fifth option to decline management of user preferences regarding the at least one tracker in the mobile app;

C2b) when the user declines the management of user preferences regarding the at least one tracker in the mobile app, prohibiting further execution of the mobile app or disabling all trackers of the at least one tracker in the mobile app; and C2c) when the user accepts the management of user preferences regarding the at least one tracker in the mobile app, providing the second GUI on the mobile device to allow the user to make the third option to opt-in or opt-out of the at least one tracker in the mobile app, D) transmitting, from the mobile device to a privacy management server, user consent information regarding at least one of the first option, the second option, the third option, the fourth option and the fifth option selected by the user so as to record an indication of consent by the user to the presence of the at least one tracker in the mobile app.

34. The computer-readable storage medium of claim 33, wherein the processor-executable instructions are included in the mobile app, and wherein the computer-readable storage medium stores the mobile app.

35. The computer-readable storage medium of claim 33, wherein:
the at least one tracker present in the mobile app includes a plurality of trackers present in the mobile app;
in B), the notice configuration file received from the first CDN server further includes corresponding tracker information for each tracker of the plurality of trackers present in the mobile app; and
in C1c) or in C2c), the second GUI includes a tracker list based on the corresponding tracker information for each tracker of the plurality of trackers present in the mobile app.

36. The computer-readable storage medium of claim 35, wherein for each tracker of the plurality of trackers present in the mobile app, the corresponding tracker information in the notice configuration file received in B) comprises:
a tracker category;
a tracker name;
a tracker function description; and
a privacy Uniform Resource Locator (URL) for a privacy policy associated with the tracker.

37. The computer-readable storage medium of claim 36, wherein the second GUI includes:
respective tracker names for the plurality of trackers, based on the corresponding tracker information for each tracker; and
for at least some of the respective tracker names, corresponding toggle buttons to allow the user to specify respective tracker consent options to either opt-in to or opt-out of corresponding trackers represented by the respective tracker names.

38. The computer-readable storage medium of claim 37, wherein:
C1c) or C2c) further comprises:
receiving, via the second GUI, at least one tracker consent option of the respective tracker consent options; and
the method further comprises:
D) transmitting the at least one tracker consent option from the mobile device to a privacy management server.

39. The computer-readable storage medium of claim 37, wherein in C1c) or C2c), the second GUI is rendered on the mobile device so as to arrange the tracker name for each tracker of the plurality of trackers based on the tracker category specified in the corresponding tracker information in the notice configuration file received in B).

40. The computer-readable storage medium of claim 37, wherein:
a first tracker of the plurality of trackers has a tracker category of essential; and
in C1c) or C2c), the second GUI includes a first tracker name for the first tracker of the plurality of trackers but does not include a first corresponding toggle button to allow the user to either opt-in to or opt-out of the first tracker, so as to prohibit disabling of the first tracker.

41. The computer-readable storage medium of claim 37, wherein in C1c) or C2c), when the user selects a first tracker name of the respective tracker names in the second GUI, the method further comprises:
rendering a third GUI on the mobile device that includes:
the tracker function description associated with the first tracker name in the corresponding tracker information; and
the privacy URL associated with the first tracker name in the corresponding tracker information.

\* \* \* \* \*